United States Patent
Vizbaras

(10) Patent No.: US 12,519,288 B2
(45) Date of Patent: Jan. 6, 2026

(54) OPTOELECTRONIC DEVICES WITH TUNABLE OPTICAL MODE AND CARRIER DISTRIBUTION IN THE WAVEGUIDES

(71) Applicant: Brolis Sensor Technology, UAB, Vilnius (LT)

(72) Inventor: Kristijonas Vizbaras, Vilnius (LT)

(73) Assignee: Brolis Sensor Technology, UAB, Vilnius (LT)

( * ) Notice: Subject to any disclaimer, the term of this patent is extended or adjusted under 35 U.S.C. 154(b) by 630 days.

(21) Appl. No.: 17/921,193

(22) PCT Filed: May 25, 2021

(86) PCT No.: PCT/EP2021/063897
§ 371 (c)(1),
(2) Date: Oct. 25, 2022

(87) PCT Pub. No.: WO2021/239729
PCT Pub. Date: Dec. 2, 2021

(65) Prior Publication Data
US 2023/0170672 A1     Jun. 1, 2023

Related U.S. Application Data

(60) Provisional application No. 63/030,094, filed on May 26, 2020.

(51) Int. Cl.
*H01S 3/098*     (2006.01)
*H01S 5/02255*     (2021.01)
(Continued)

(52) U.S. Cl.
CPC ........ *H01S 5/2054* (2013.01); *H01S 5/02255* (2021.01); *H01S 5/0614* (2013.01);
(Continued)

(58) Field of Classification Search
CPC .. H01S 5/2054; H01S 5/02255; H01S 5/0614; H01S 5/065; H01S 5/22; H01S 5/34346; H01S 2304/02
See application file for complete search history.

(56) References Cited

U.S. PATENT DOCUMENTS 3,702,975 A    11/1972   Miller
4,408,330 A    10/1983   An
(Continued)

FOREIGN PATENT DOCUMENTS

CN     102226990 A    10/2011
CN     104685736 A    6/2015
(Continued)

OTHER PUBLICATIONS

Behringer, M., "High-Power Diode Laser Technology and Characteristics," Springer Series in Optical Sciences vol. 128, Chapter 2, pp. 5-74 (2007).
(Continued)

*Primary Examiner* — Kinam Park
(74) *Attorney, Agent, or Firm* — Goodwin Procter LLP

(57) ABSTRACT

Solid-state optical devices (10) enable tuning of an electrically tunable depletion region (200) to reduce and block lateral (in-junction) carrier spreading. This capability reduces the negative effects of gain-guiding in the junction plane and reduces an astigmatism of an emitted light beam. The tunable depletion region is created by forming a highly resistive Schottky contact (105, 110) or metal-insulator-semiconductor (MIS) structure (205, 210) next to a waveguide (optical mode propagation) and current injection region (215), where lateral spread due to diffusion is expected. The depletion region area is tuned by applying a bias to the highly resistive Schottky contact or the MIS contact structure. Such contacts or similar lossy structures reduce in-junction plane gain-guiding also when unbiased
(Continued)

by creating additional optical loss for the mode, thus reducing the effective carrier density participating in light generation, thereby reducing astigmatism.

29 Claims, 10 Drawing Sheets

(51) Int. Cl.
*H01S 5/06* (2006.01)
*H01S 5/065* (2006.01)
*H01S 5/20* (2006.01)
*H01S 5/22* (2006.01)
*H01S 5/343* (2006.01)

(52) U.S. Cl.
CPC .............. *H01S 5/065* (2013.01); *H01S 5/22* (2013.01); *H01S 5/34346* (2013.01); *H01S 2304/02* (2013.01)

(56) References Cited

U.S. PATENT DOCUMENTS

| | | | |
|---|---|---|---|
| 4,430,741 A | 2/1984 | Fukuzawa et al. |
| 4,481,631 A | 11/1984 | Henry et al. |
| 4,534,033 A | 8/1985 | Nishizawa et al. |
| 5,063,569 A | 11/1991 | Xie |
| 5,082,342 A | 1/1992 | Wight et al. |
| 5,138,626 A | 8/1992 | Yap |
| 5,241,554 A | 8/1993 | Iga et al. |
| 5,270,554 A | 12/1993 | Palmour |
| 5,341,391 A | 8/1994 | Ishimura |
| 5,371,757 A | 12/1994 | Largent |
| 5,471,067 A | 11/1995 | Ikeda et al. |
| 5,543,638 A | 8/1996 | Nettelbladt et al. |
| 5,568,502 A | 10/1996 | Hironaka |
| 5,764,670 A | 6/1998 | Ouchi |
| 5,821,566 A | 10/1998 | Kang |
| 6,040,590 A | 3/2000 | OBrien et al. |
| 6,654,398 B2 | 11/2003 | Cho et al. |
| 6,690,035 B1 | 2/2004 | Yokogawa et al. |
| 6,865,214 B2 | 3/2005 | Kim |
| 6,949,774 B2 | 9/2005 | Parikh et al. |
| 7,016,381 B2 | 3/2006 | Husain et al. |
| 7,424,042 B2 | 9/2008 | Day et al. |
| 7,528,403 B1 | 5/2009 | Borselli et al. |
| 8,208,502 B2 | 6/2012 | Srinivasan et al. |
| 8,355,606 B2 | 1/2013 | Englund et al. |
| 8,481,939 B2 | 7/2013 | Kajiki |
| 8,911,093 B2 | 12/2014 | Mochizuki |
| 8,955,987 B2 | 2/2015 | Mochizuki |
| 9,142,715 B2 | 9/2015 | Kim et al. |
| 9,244,295 B2 | 1/2016 | Fujikata et al. |
| 9,423,678 B2 | 8/2016 | Mochizuki et al. |
| 9,488,779 B2 | 11/2016 | Tseng et al. |
| 9,859,682 B2 | 1/2018 | Oh et al. |
| 10,109,983 B2 | 10/2018 | Liang et al. |
| 10,141,480 B2 | 11/2018 | Lee et al. |
| 10,186,676 B2 | 1/2019 | Ahmed et al. |
| 10,338,220 B1 | 7/2019 | Raring et al. |
| 10,396,521 B2 | 8/2019 | Kurczveil et al. |
| 2003/0109142 A1 | 6/2003 | Cable et al. |
| 2016/0141835 A1 | 5/2016 | Liang et al. |
| 2017/0186907 A1 | 6/2017 | Chaji et al. |
| 2017/0251533 A1 | 8/2017 | Shur et al. |
| 2019/0052059 A1 | 2/2019 | Kubota |

FOREIGN PATENT DOCUMENTS

| | | |
|---|---|---|
| CN | 105449519 A | 3/2016 |
| GB | 0203679 A | 2/1924 |
| JP | H0638543 | 2/1994 |
| JP | H08204280 A | 8/1996 |
| JP | H09260764 A | 10/1997 |
| JP | 2685441 B2 | 12/1997 |
| JP | 3825498 B2 | 9/2006 |
| JP | 2009158550 A | 7/2009 |
| JP | 6394210 B2 | 9/2018 |
| KR | 20060088160 A | 8/2006 |
| TW | I568117 B | 1/2017 |
| WO | WO-2019182666 A1 | 9/2019 |

OTHER PUBLICATIONS

Frommer et al., "Direct Modulation and Optical Confinement Factor Modulation of Semiconductor Lasers," Appl. Phys. Lett. 67(12):1645-1647 (1995).

Haret et al., "Schottky MSM Junctions for Carrier Depletion in Silicon Photonic Crystal Microactivities," Optics Express 21(8):10324-10334 (2013).

International Search Report for International Patent Application No. PCT/EP2021/063897 mailed Nov. 12, 2021 (6 pages).

Written Opinion for International Patent Application No. PCT/EP2021/063897, mailed Nov. 12, 2021 (16 pages).

OPTOELECTRONIC DEVICES WITH TUNABLE OPTICAL MODE AND CARRIER DISTRIBUTION IN THE WAVEGUIDES

CROSS-REFERENCE TO RELATED APPLICATIONS

This application is the national stage of International (PCT) Patent Application No. PCT/EP 2021/063897, filed on May 25, 2021, which claims the benefit of, and priority to, U.S. Provisional Application Ser. No. 63/030,094, entitled "Optoelectronic Devices with Tunable Optical Mode and Carrier Distribution in the Wave-Guides," filed on May 26, 2020, each of which is incorporated herein by reference in its entirety.

FIELD OF THE INVENTION

Embodiments of the invention relate generally to solid state-based optical devices, and particularly to solid state optical devices with astigmatic output beams, such as gain-guided semiconductor light emitters.

BACKGROUND OF THE INVENTION

Astigmatic light output profile is a well-known problem of gain-guided or quasi gain-guided solid-state light emitters, especially semiconductor lasers, where optical mode guiding perpendicular to the junction is achieved by index guiding of different epitaxial layers (claddings, waveguides, active region, etc.) and optical mode guiding in the junction plane (epitaxial layer plane) is achieved by gain-guiding and is strongly affected by lateral carrier spreading (out-diffusion). See Cook, D. D., & Nash, F. R. (1975) "Gain-induced guiding and astigmatic output beam of GaAs lasers," *Journal of Applied Physics*, 1660-1672.

In modern times, whenever possible, fully index-guided solutions are implemented to avoid astigmatic beams, which make optical beam shaping much more complex and less efficient, thus limiting application potential. See, e.g., Chuang, S. L. (1995) *Physics of Optoelectronic Devices.*

Fully index-guided light emitters can be achieved, for example, by etching completely through the active region and confining carrier laterally by mesa geometry. However, this approach tends to create unwanted negative effects of surface recombination at the active region, which increases threshold current substantially and heats up the device considerably, as lateral heat removal is hindered, leading to deteriorated overall device performance. Another way is to utilize multiple epitaxial growth steps to fabricate a double buried heterostructure device. Here, after etching through the active region, the device is overgrown with lattice matched III-V material, which passivates the etched sidewalls, thus reducing surface recombination, blocks lateral carrier flow and makes a high quality interface, allowing efficient heat removal. The downside of this approach is the complexity of second epitaxial overgrowth and much more complex fabrication process.

SUMMARY OF THE INVENTION

Embodiments of the invention reduce the negative effect of gain-guiding and optical field astigmatism in the junction plane and limit lateral carrier diffusion from the active region without etching through the active region. Thus, surface recombination is negligible. Moreover, the crystal lattice surrounding the active region is unhindered, and heat transport by phonon interaction remains very effective. Finally, a process is provided that requires a single epitaxial growth step, without additional fabrication process complexities.

Embodiments of the invention include (i) utilization of an electrically tunable depletion region and/or (ii) additional optical loss structures in the vicinity of carrier flow and optical mode propagation.

Devices in accordance with embodiments of the invention enable tuning of an electrically tunable depletion region to reduce and block lateral (in-junction) carrier spreading. This capability reduces the negative effects of gain-guiding in the junction plane (which is the same as the epitaxial layer plane, as junctions forms at an interface of two layers) and reducing an astigmatism of an emitted light beam, since the quality of the emitted light beam closely depends on carrier distribution in the epitaxial layer plane.

Such a tunable depletion region can be created by forming a highly resistive Schottky contact or metal-insulator-semiconductor (MIS) structure next to the waveguide (optical mode propagation) and current injection region, where lateral spread due to diffusion is expected. The depletion region area is tuned by applying a bias to the highly resistive Schottky contact or the MIS contact structure.

Such contacts or similar lossy structures reduce in-junction plane gain-guiding also when unbiased by creating additional optical loss for the mode, thus reducing the effective carrier density participating in light generation, and thereby reducing astigmatism. The devices described herein are solid-state devices, with all components realized during the same fabrication run and, therefore, do not increase fabrication complexity.

Moreover, the fact that semiconductor crystal lattice of the device is uninterrupted mechanically leads to highly beneficial lateral heat transport, allowing the reduction of active region heating and increasing electro-optical device performance.

Finally, better localization of carriers in gain-guided or quasi-gain-guided structures leads to reduction of electrical input power and, therefore, increased device performance.

Embodiments of the invention are particularly useful when efficient light coupling to various optical components, such as lenses, fibers, integrated photonic circuits, modulation of in-junction carrier distribution or optical modulation and switching, is required. Structures and methods described herein allow reducing the number of optical components required to produce a high quality beam as well as provide means of fine electrical tuning of the optical mode profile to efficiently couple into desired optical components. At the same time, embodiments of the invention allow the reduction of the threshold current in gain-guided or quasi-gain-guided semiconductor laser devices by reducing lateral carrier out-diffusion, thus further boosting device performance, such as efficiency, output power, and reduction in overall power consumption. Embodiments of the invention also allow modulation of in-junction gain-profile and carrier distribution, thus, effectively modulating light output power and optical field profile and enabling optical switching and modulation. Embodiments of the invention can benefit photonic applications that require efficient device performance, coupling into optical components, photonic integrated circuits, etc. Examples of applications include telecommunications, sensing, LIDAR applications, etc.

In an aspect, embodiments of the invention relate to a solid-state optical device including a semiconductor substrate and a solid-state gain medium disposed on a frontside of the semiconductor substrate and including a plurality of epitaxial layers including (a) a plurality of dopants and (b) an active region comprising at least one active layer configured to allow carrier recombination and light generation, the solid-state gain medium configured to emit light with a beam propagation direction. A waveguide low resistivity metal contact pad is disposed over and in contact with a portion of a topmost epitaxial layer of the plurality of epitaxial layers, wherein during operation carriers flow and the emitted light propagates in a volume of the epitaxial layers disposed under the waveguide metal contact pad. A first and second Schottky contact include, respectively, a first and a second metal contact pad disposed near the waveguide metal contact pad, each of the first and second metal contact pads being in contact with a respective portion of a top epitaxial layer of the plurality of epitaxial layers disposed directly thereunder. An electrical substrate contact is in contact with the semiconductor substrate. At least one output mirror is defined by a cleaved edge of the plurality of epitaxial layers. An anti-reflective coating is disposed on the at least one output mirror, the anti-reflective coating being configured to prevent self-lasing. A depletion region is disposed in the epitaxial layers under each of the first and second metal contact pads, extending from the first and second metal contact pads to the active region. Application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad. A width of each depletion region is tunable by varying the bias to the first and second metal contact pads. Tuning the width of each depletion region changes an effective waveguide width under the waveguide metal contact pad and creates a potential barrier for lateral diffusion of carriers injected via the waveguide low resistivity metal contact pad. The beam propagation direction is in-plane with the plurality of epitaxial layers.

One or more of the following features may be included. Tuning the width of each depletion region may locally change a carrier distribution under the waveguide metal contact pad. Changing the carrier distribution changes at least one of refractive index, optical mode profile, and/or loss of the volume of the epitaxial layers through which the emitted light propagates.

The electrical substrate contact may include a metal layer disposed on a backside of the semiconductor substrate and/or a metal filled via terminating at the frontside of the semiconductor substrate.

Each of the Schottky contacts may be highly resistive. e.g., a resistivity of each Schottky contact may be at least $1\times10^{-3}$ $\Omega cm^2$.

The solid-state gain medium may include a ridge disposed under the waveguide metal contact pad.

The substrate and the gain medium may each include a III-V semiconductor material, e.g., Al, Ga, In, As, Sb, P, N, Bi, and/or alloy combinations thereof.

The anti-reflective coating may have a power reflectivity of less than $1\times10^{-2}$. The anti-reflective coating may include a dielectric material (e.g., $SiO_2$ and/or $Al_2O_3$) and/or a semiconductor material (e.g., Si and/or ZnSe).

The description of elements of the embodiments of other aspects of the invention may be applied to this aspect of the invention as well.

In another aspect, embodiments of the invention relate to a solid-state optical device including a semiconductor substrate, and a solid-state gain medium disposed on a frontside of the semiconductor substrate and including a plurality of epitaxial layers including (a) a plurality of dopants and (b) an active region comprising at least one active layer configured to allow carrier recombination and light generation, the solid-state gain medium configured to emit light with a beam propagation direction. A waveguide low resistivity metal contact pad is disposed over and in contact with a portion of a topmost epitaxial layer of the plurality of epitaxial layers. During operation carriers flow and the emitted light propagates in a volume of the epitaxial layers disposed under the waveguide low resistivity metal contact pad. A first and second metal-insulator-semiconductor (MIS) contact include respectively, a first and a second metal contact pad disposed near the waveguide low resistivity metal contact pad, each of the first and second metal pads being disposed over an insulator layer in contact with a respective portion of a top epitaxial layer of the plurality of epitaxial layers disposed directly thereunder. An electrical substrate contact is in contact with the semiconductor substrate. An output mirror is defined by a cleaved edge of the plurality of epitaxial layers. An anti-reflective coating is disposed on the output mirror, the anti-reflective coating being configured to prevent self-lasing. Applying a bias to the first and second metal contact pads creates a depletion region in the epitaxial layers directly under each of the first and second metal contact pad, extending from the first and second metal contact pads to the active region. Application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad. A width of each depletion region is tunable by varying the bias to the first and second metal contact pads. Tuning the width of each depletion region changes an effective waveguide width under the waveguide metal contact pad and creates a potential barrier for lateral diffusion of carriers injected via the waveguide low resistivity metal contact pad. The beam propagation direction is in-plane with the plurality of epitaxial layers.

One or more of the following features may be included. The insulator layer may include an oxide and/or a nitride.

Tuning the width of each depletion region may locally change a carrier distribution under the waveguide metal contact pad. Changing the carrier distribution may change a refractive index, an optical mode profile, and/or loss of the volume of the epitaxial layers through which the emitted light propagates.

The electrical substrate contact may include a metal layer disposed on a backside of the semiconductor substrate and/or a metal filled via terminating at the frontside of the semiconductor substrate.

Each of the MIS contacts may be insulating.

The solid-state gain medium may include a ridge disposed under the waveguide metal contact pad. The substrate and the gain medium may each include a III-V semiconductor material.

The III-V semiconductor material may include Al, Ga, In, As, Sb, P, N, Bi, and/or alloy combinations thereof.

The anti-reflective coating may have a reflectivity of less than $1\times10^{-2}$. The anti-reflective coating may include a dielectric material (e.g., $SiO_2$ and/or $Al_2O_3$) and/or a semiconductor material (e.g., Si and/or ZnSe).

The description of elements of the embodiments of other aspects of the invention may be applied to this aspect of the invention as well.

In still another aspect, a solid-state optical device includes a semiconductor substrate and a solid-state gain medium disposed on the semiconductor substrate and including a plurality of epitaxial layers including (a) a plurality of dopants and (b) an active region comprising at least one active layer configured to allow carrier recombination and light generation, the solid-state gain medium configured to emit light with a beam propagation direction in-plane with the epitaxial layers. A waveguide metal contact pad is disposed over and in contact with a portion of a topmost epitaxial layer of the plurality of epitaxial layers, wherein during operation carriers flow and the emitted light propagates in a volume of the epitaxial layers disposed under the waveguide metal contact pad. An optically lossy structure is disposed near the waveguide metal contact pad. An electrical substrate contact is in contact with the semiconductor substrate. An output mirror is defined by a cleaved edge of the plurality of epitaxial layers. An anti-reflective coating is disposed on the output mirror, the anti-reflective coating being configured to prevent self-lasing. The optically lossy structure creates a loss to an optical mode in a portion of the epitaxial layers disposed thereunder, thereby reducing in-plane gain and limiting participation in gain of carriers laterally diffused from the volume of epitaxial layers disposed under the waveguide metal contact pad.

One or more of the following features may be included. A plurality of metal contact pads, disposed near the volume where carriers are flowing and optical beam is propagating, may be configured to create a controlled, tunable high resistivity contact and depletion region in regions of the plurality of epitaxial layers disposed below the contact pads, and thereby locally changing at least one of a refractive index, a carrier distribution, an optical mode profile, or loss.

The optically lossy structure may include a doped non-metal structure, a metal structure, an intentionally rough surface, and/or a metal-insulator-semiconductor structure.

The description of elements of the embodiments of other aspects of the invention may be applied to this aspect of the invention as well.

In still another aspect, embodiments of the invention relate to a method of controlling an astigmatism of a light beam emitted by a solid-state optical device. The method includes providing the solid-state optical device, the solid-state optical device including a semiconductor substrate and a solid-state gain medium disposed on a frontside of the semiconductor substrate and including a plurality of epitaxial layers including (a) a plurality of dopants and (b) an active region comprising at least one active layer configured to allow carrier recombination and light generation, the solid-state gain medium configured to emit the light beam with a beam propagation direction in-plane with the epitaxial layers. A waveguide low resistivity metal contact pad is disposed over and in contact with a portion of a topmost epitaxial layer of the plurality of epitaxial layers, wherein during operation carriers flow and the emitted light propagates in a volume of the epitaxial layers disposed under the waveguide electrical contact pad. A first and a second Schottky contact include, respectively, a first and a second metal contact pad disposed next to the waveguide low resistivity metal contact pad, each of the first and second metal contact pads being in contact with a respective portion of a top epitaxial layer of the plurality of epitaxial layers disposed directly thereunder. An electrical contact is in contact with the semiconductor substrate. An output mirror is defined by a cleaved edge of the plurality of epitaxial layers. An anti-reflective coating is disposed on the mirror, the anti-reflective coating being configured to prevent self-lasing. A depletion region is disposed in the epitaxial layers under each of the first and second metal contact pads, extending from the first and second metal contact pads. A bias is applied to each of the first and second metal contact pads to tune the depletion regions in the epitaxial layers under each of the first and second metal contact pads, thereby bending energy bands in the epitaxial layers to create a tunable potential barrier for lateral carrier out-diffusion from underneath the waveguide metal contact pad.

One or more of the following features may be included. A width of each depletion region may be tuned by varying the bias, wherein tuning the width of each depletion region changes an effective waveguide width under the waveguide metal contact pad.

A polarity of each of the bias applied to the waveguide low resistivity metal contact pad and first and second metal contact pads may be the same. A polarity of the bias applied to the waveguide low resistivity metal contact pad may be different from a polarity of the bias applied to the first and second metal contact pads.

The description of elements of the embodiments of other aspects of the invention may be applied to this aspect of the invention as well.

In yet another aspect, embodiments of the invention relate to a method of controlling an astigmatism of a light beam emitted by a solid-state optical device. The method includes providing the solid-state optical device that includes a semiconductor substrate and a solid-state gain medium disposed on a frontside of the semiconductor substrate and comprising a plurality of epitaxial layers including (a) a plurality of dopants and (b) an active region comprising at least one active layer configured to allow carrier recombination and light generation, the solid-state gain medium configured to emit the light beam with a beam propagation direction in-plane with the epitaxial layers. A waveguide low resistivity metal contact pad is disposed over and in contact with a portion of a topmost epitaxial layer of the plurality of epitaxial layers, wherein during operation carriers flow and the emitted light propagates in a volume of the epitaxial layers disposed under the waveguide electrical contact pad. A first and second metal-insulator-semiconductor (MIS) contact include, respectively, a first and a second metal pad disposed near the waveguide low resistivity metal contact pad, each of the first and second metal pads being disposed over an insulator layer in contact with a respective portion of a top epitaxial layer of the plurality of epitaxial layers disposed directly thereunder. An electrical substrate contact is in contact with the semiconductor substrate. An output mirror is defined by a cleaved edge of the plurality of epitaxial layers. An anti-reflective coating disposed on the output mirror, the anti-reflective coating being configured to prevent self-lasing. A bias is applied to each of the first and second metal contact pads to create a depletion region in the epitaxial layers directly under each of the first and second metal contact pads and extending from the first and second metal contact pads to the active region. The depletion regions are tuned by varying the bias, thereby bending energy bands in the epitaxial layers to create a tunable potential barrier for lateral carrier out-diffusion from underneath the waveguide metal contact pad.

One or more of the following features may be included. A width of each depletion region may be tuned by varying the bias, wherein tuning the width of each depletion region changes an effective waveguide width under the waveguide metal contact pad.

A polarity of each of the bias applied to the waveguide low resistivity metal contact pad and first and second metal contact pads may be the same. A polarity of the bias applied to the waveguide low resistivity metal contact pad may be different from a polarity of the bias applied to the first and second metal contact pads.

In still another aspect, embodiments of the invention relate to a method for controlling an astigmatism of a light beam emitted by a solid-state optical device. The method includes providing the solid-state optical device, The solid-state optical device includes a solid-state gain medium including a plurality of epitaxial layers including (a) a plurality of dopants and (b) an active region comprising at least one active layer configured to allow carrier recombination and light generation, the solid-state gain medium configured to emit the light beam with a beam propagation direction in-plane with the epitaxial layers. A waveguide low resistivity metal contact pad is disposed over and in contact with a portion of a topmost epitaxial layer of the plurality of epitaxial layers, wherein during operation carriers flow and the emitted light propagates in a volume of the epitaxial layers disposed under the waveguide electrical contact pad. A first and a second Schottky contact include, respectively, a first and a second metal contact pad disposed next to the waveguide low resistivity metal contact pad, each of the first and second metal contact pads being in contact with a respective portion of a top epitaxial layer of the plurality of epitaxial layers disposed directly thereunder. An electrical contact is in contact with one of the plurality of epitaxial layers having an electrical conductivity type opposite to that of the topmost epitaxial layer beneath the waveguide low resistivity metal contact pad, and located on a side of the active region distal from the topmost epitaxial layer directly beneath the waveguide low resistivity metal contact pad. An output mirror is defined by a cleaved edge of the plurality of epitaxial layers. An anti-reflective coating disposed on the mirror, the anti-reflective coating being configured to prevent self-lasing. A depletion region is disposed in the epitaxial layers under each of the first and second metal contact pads, extending from the first and second metal contact pads. A bias is applied to each of the first and second metal contact pads to tune the depletion regions in the epitaxial layers under each of the first and second metal contact pads, thereby bending energy bands in the epitaxial layers to create a tunable potential barrier for lateral carrier out-diffusion from underneath the waveguide metal contact pad.

In yet another aspect, embodiments of the invention relate to a solid-state optical device including a solid-state gain medium comprising a plurality of epitaxial layers including (a) a plurality of dopants and (b) an active region comprising at least one active layer configured to allow carrier recombination and light generation, the solid-state gain medium configured to emit light with a beam propagation direction. A waveguide low resistivity metal contact pad disposed over and in contact with a portion of a topmost epitaxial layer of the plurality of epitaxial layers, wherein during operation carriers flow and the emitted light propagates in a volume of the epitaxial layers disposed under the waveguide metal contact pad. A first and second Schottky contact include, respectively, a first and a second metal contact pad disposed near the waveguide metal contact pad, each of the first and second metal contact pads being in contact with a respective portion of a top epitaxial layer of the plurality of epitaxial layers disposed directly thereunder. An electrical contact is in contact with one of the plurality of epitaxial layers having an electrical conductivity type opposite to that of the topmost epitaxial layer beneath the waveguide low resistivity metal contact pad and located on a side of the active region distal from that of the topmost epitaxial layer directly beneath the waveguide low resistivity metal contact pad. At least one output mirror is defined by a cleaved edge of the plurality of epitaxial layers. An anti-reflective coating is disposed on the at least one output mirror, the anti-reflective coating being configured to prevent self-lasing. A depletion region is disposed in the epitaxial layers under each of the first and second metal contact pads, extending from the first and second metal contact pads to the active region. Application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad. A width of each depletion region is tunable by varying the bias to the first and second metal contact pads. Tuning the width of each depletion region changes an effective waveguide width under the waveguide metal contact pad and creates a potential barrier for lateral diffusion of carriers injected via the waveguide low resistivity metal contact pad. Thee beam propagation direction is in-plane with the plurality of epitaxial layers.

In still another aspect, embodiments of the invention relate to a solid-state optical device including a solid-state gain medium comprising a plurality of epitaxial layers including (a) a plurality of dopants and (b) an active region comprising at least one active layer configured to allow carrier recombination and light generation, the solid-state gain medium configured to emit light with a beam propagation direction. A waveguide low resistivity metal contact pad is disposed over and in contact with a portion of a topmost epitaxial layer of the plurality of epitaxial layers, wherein during operation carriers flow and the emitted light propagates in a volume of the epitaxial layers disposed under the waveguide low resistivity metal contact pad. A first and second metal-insulator-semiconductor (MIS) contact include, respectively, a first and a second metal contact pad disposed near the waveguide low resistivity metal contact pad, each of the first and second metal pads being disposed over an insulator layer in contact with a respective portion of a top epitaxial layer of the plurality of epitaxial layers disposed directly thereunder. An electrical contact is in contact with one of the plurality of epitaxial layers having an electrical conductivity type opposite to that of the topmost epitaxial layer beneath the waveguide low resistivity metal contact pad, and located on a side of the active region distal from the topmost epitaxial layer directly beneath the waveguide low resistivity metal contact pad. An output mirror is defined by a cleaved edge of the plurality of epitaxial layers. An anti-reflective coating is disposed on the output mirror, the anti-reflective coating being configured to prevent self-lasing. Applying a bias to the first and second metal contact pads creates a depletion region in the epitaxial layers directly under each of the first and second metal contact pad, extending from the first and second metal contact pads to the active region. Application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad. A width of each depletion region is tunable by varying the bias to the first and second metal contact pads. Tuning the width of each depletion region changes an effective waveguide width under the waveguide metal contact pad and creates a potential barrier for lateral diffusion of carriers injected via the waveguide low resistivity metal contact pad, The beam propagation direction is in-plane with the plurality of epitaxial layers.

DETAILED DESCRIPTION

Various embodiments of the invention are suitable for providing improved light output beam quality to applications that utilize solid-state semiconductor lasers, including gain-guided lasers. Embodiments of the invention may be especially beneficial in cases where pure index-guiding cannot be used either due to physical problems, such as high surface recombination and leakage, or due to economic reasons, where additional epitaxial growth and additional required pre- and post-processing steps increase the cost of the final device and make it less likely to enter large volume markets.

A general problem of solid-state lasers, especially semiconductor lasers, is that in a vertical (growth) direction it is possible to produce a fully index-guided mode, whereas in the junction plane (parallel to growth direction) the mode is typically, at least, partially gain-guided, due to carrier out-diffusion. See Cook, D. D., & Nash, F. R. (1975) "Gain-induced guiding and astigmatic output beam of GaAs lasers," *Journal of Applied Physics*, 1660-1672. This is especially critical in integrating or coupling such solid-state devices into group-IV photonic integrated circuits, in which mode-matching astigmatic beams is very complex.

Embodiments of the current invention provide ways to reduce in-junction plane gain-guiding and, therefore, astigmatism.

Figure 1A:
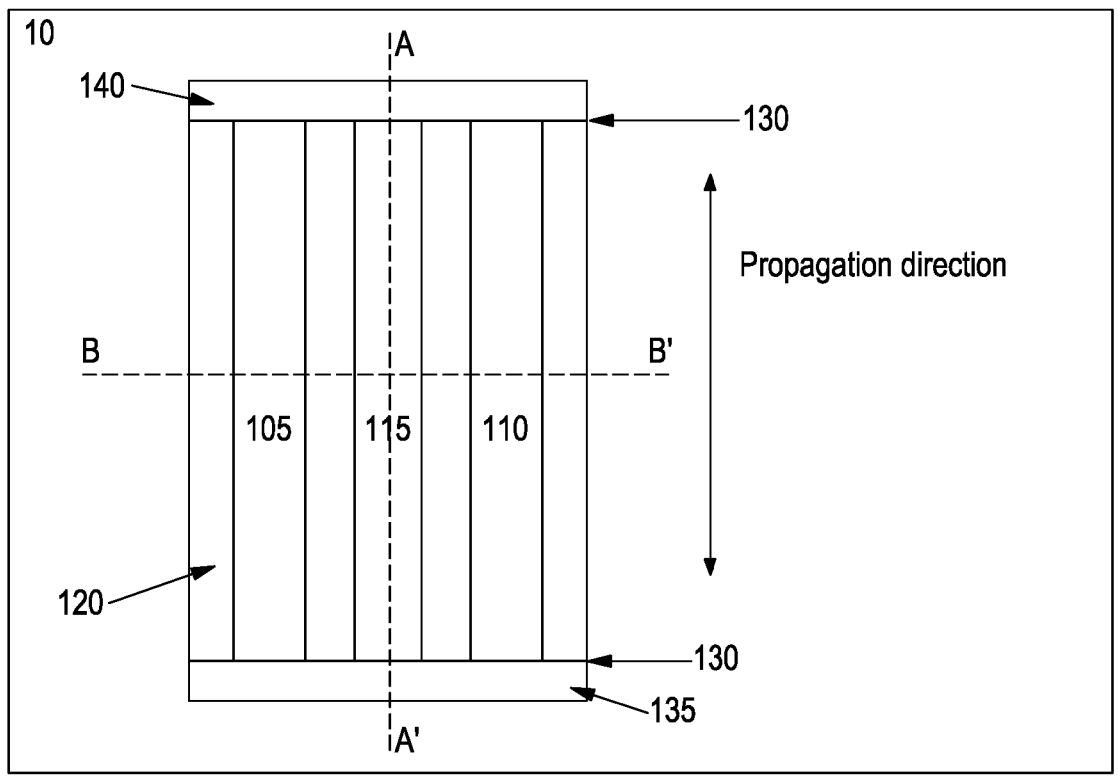
FIG. 1a is a top view of a solid-state optical device including Schottky contacts, in accordance with an embodiment of the invention.

Referring to FIGS. 1a-1d, in a solid-state light emitting device 10 in accordance with an embodiment of the invention, the optical mode is index-guided in a direction perpendicular to the epitaxial layer plane and gain guided in the in-plane direction. In particular, FIG. 1a is a top view of the device 10, with first and second Schottky contacts 105, 110 disposed on both sides of a low resistivity waveguide contact 115 on top of a plurality of epitaxial layers 120 including the gain medium. The first and second Schottky contacts 105, 110 each include metal contact pads, each forming a metal-semiconductor interface. Output mirror facets 130 are disposed at interfaces between the semiconductor material (i.e., epitaxial layer structure 120 and an underlying substrate) and deposited coatings 135, 140. AA' marks the cross-section depicted in FIG. 1b and BB' marks the cross-sections depicted in FIGS. 1c and 1d.

Figure 1B:
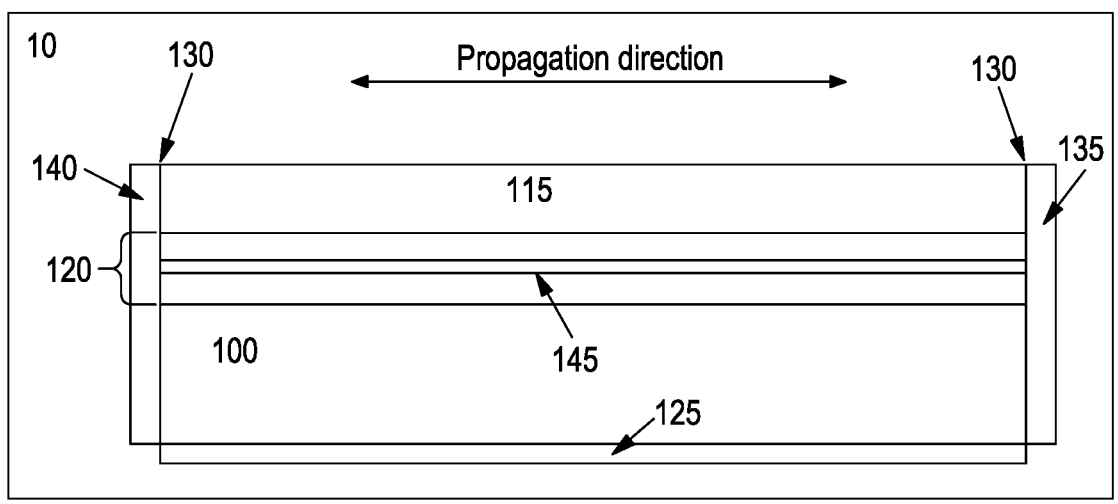
FIG. 1b is a cross-sectional view of the solid-state optical device of FIG. 1a, parallel to a beam propagation direction, in accordance with an embodiment of the invention.

Referring to FIG. 1b, which is a cross-sectional view AA' of device 10 of FIG. 1a, the plurality of epitaxial layers 120 are disposed on a substrate 100. The epitaxial layers 120 include an active region 145. A backside substrate contact 125 is disposed on a backside of the substrate 100. Coatings 135, 140 are disposed on the cleaved output facets 130. The low resistivity waveguide contact 115 is disposed over the epitaxial layers 120.

Figure 1C:
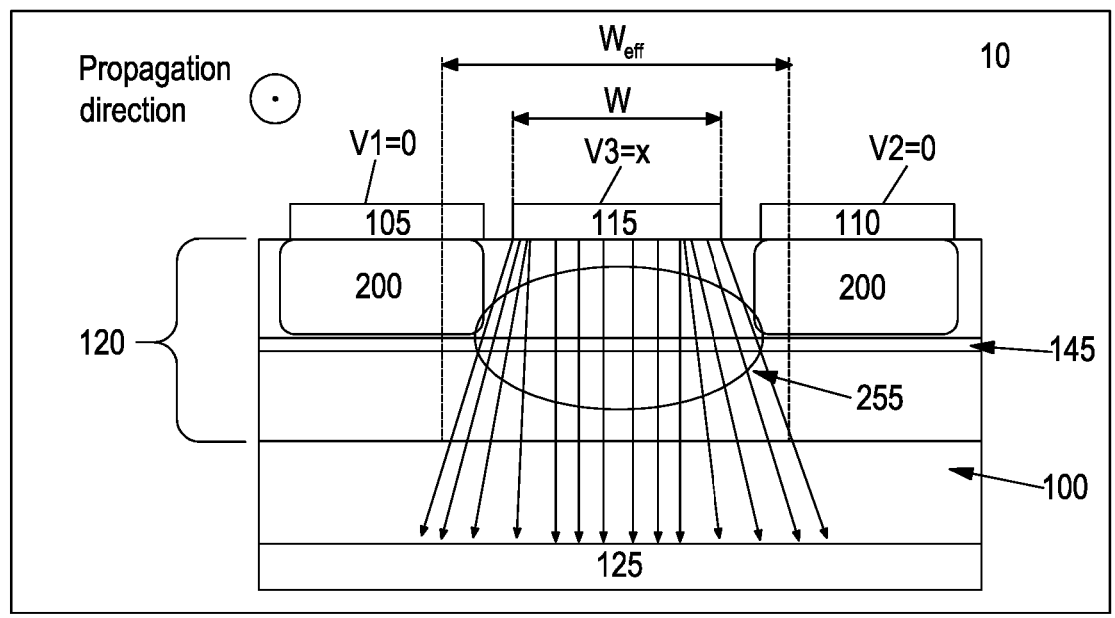
FIG. 1c is a cross-sectional view of the solid-state optical device of FIG. 1a, perpendicular to a beam propagation direction and with no bias applied to the Schottky contacts, in accordance with an embodiment of the invention.
Figure 1D:
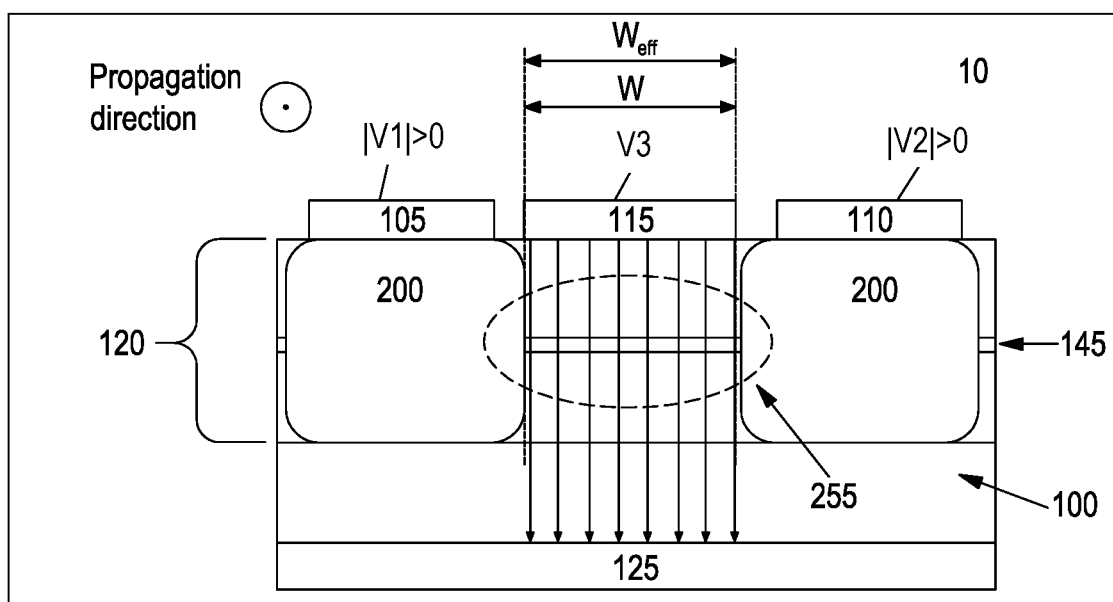
FIG. 1d is a cross-sectional view of the solid-state optical device of FIG. 1a, perpendicular to a beam propagation direction with a bias applied to the Schottky contacts, in accordance with an embodiment of the invention.

Referring to FIG. 1c, which is a cross-sectional view BB' of the device 10 of FIG. 1a, first and second Schottky contacts 105, 110 are disposed on both sides of the low resistivity waveguide contact 115. Upon the application of a bias to metal contact pads of the Schottky contacts 105, 110, depletion regions 200 form below the first and second Schottky contacts 105, 110, respectively. The depletion regions 200 are formed at the interface between the metal Schottky contacts 105, 110 and the epitaxial semiconductor layers below and protrude into the epitaxial layers, extending until the active region 145. In the figure, arrows descending from waveguide 115 to the backside contact 125 show a schematic path of injected current flow from top-most waveguide contact and into the substrate contact, across the active region 145. The actual physical width of the low resistivity waveguide contact 115 is indicated by W, and effective width of the current injection aperture due to lateral carrier diffusion is indicated by $W_{\mathit{eff}}$. In the illustrated embodiment, zero bias is applied to the metal Schottky contacts 105, 110, i.e., V1 and V2=0. An arbitrary forward bias value V3=x is used to drive current through the structure. A dashed ellipse 255 indicates the optical mode profile. Like FIG. 1c, FIG. 1d is a cross-sectional view BB' of the device 10 of FIG. 1A, distinguished in that a separate bias is applied to the metal contact pads of the Schottky contacts 105, 110 to increase the width of the depletion regions 200 width across the active region 145. The bias also reduces lateral carrier out-diffusion and current spreading effects. This is illustrated schematically with arrows descending from waveguide 115 to the backside contact 125, with effective current aperture width $W_{\mathit{eff}}$ coinciding with actual physical width W of the low resistivity waveguide 115. The dashed ellipse 255 indicates the optical mode profile.

During operation, light is generated in the active region 145 by applying forward bias between the low resistivity waveguide contact 115 and electrical substrate contact 125 and inhibiting carrier flow across the epitaxial layer stack. The generated light propagates inside the device between the cleaved facets, and exits via the facets. The Schottky contacts 105, 110 are highly resistivity metal-semiconductor contacts, and create a barrier at the interface and the depletion region 200 that extends into the epitaxial layer stack 120 below. The width of such depletion region can be tuned by applying an external bias. See Sze, *Physics of Semiconductor Devices*, John Wiley & Sons (1981). When a bias is applied to each of the first and second metal contact pads of the Schottky contacts to tune the depletion regions in the epitaxial layers under each of the first and second metal contact pads, energy bands in the epitaxial layers are bent to create a tunable potential barrier for lateral carrier out-diffusion from underneath the waveguide metal contact pad.

A polarity of each of the bias applied to the waveguide low resistivity metal contact pad and first and second metal contact pads may be the same or the polarities may be different.

Tuning the width of each depletion region locally changes a carrier distribution under the waveguide metal contact pad. Changing the carrier distribution changes the refractive index, optical mode profile, and optical loss of the volume of the epitaxial layers through which the emitted light propagates. If depletion regions from both sides of the waveguide contact extend into the active region layer stack, carriers injected there face a lateral potential barrier, hindering out-diffusion. Thus, gain-guiding in the in-junction plane is reduced, thereby reducing the astigmatism. This behavior is illustrated in FIGS. 1c and 1d that depict $W_{\mathit{eff}}$, which corresponds to an effective current aperture, including the carrier out-diffusion. After application of a bias to the Schottky contacts, $W_{\mathit{eff}}$ is approximately equal to the actual physical contact width W.

In some embodiments, device 10 is a III-V semiconductor device fabricated as follows. A solid-state gain medium is formed over a semiconductor substrate 100. Each of the substrate and the gain medium may include a III-V semiconductor material. The III-V semiconductor material may include Al, Ga, In, As, Sb, P, N, Bi, and/or alloy combinations thereof. The solid-state gain medium includes a plurality of epitaxial layers 120 that include a plurality of dopants, as well as the active region 145 with at least one active layer configured to allow carrier recombination and light generation, with the solid-state gain medium configured to emit light with a beam propagation direction.

The epitaxial layers can be deposited by any conventional technique, such as molecular beam epitaxy (MBE), metalorganic chemical vapor deposition (MOCVD), etc. Three contacts are formed over the plurality of epitaxial layers. The formation of the contacts can be done by electron beam evaporation, magnetron sputtering, a combination of the two techniques, or other means, known to people skilled in the art of semiconductor technology. Two contacts are highly resistive first and second metal-semiconductor contacts (Schottky contacts) 105, 110. The resistivity of each Schottky contact may be at least $1\times10^{-3}$ $\Omega \mathrm{cm}^2$. The Schottky contacts are disposed near the waveguide metal contact pad 115 and in contact with a respective portion of the epitaxial layer directly thereunder. The waveguide low resistivity metal contact 115 is in contact with the topmost epitaxial layer of the plurality of the epitaxial layers. The resistivity of the waveguide low resistivity metal contact may be no more than $1\times10^{-3}$ $\Omega \mathrm{cm}^2$. During operation, carriers flow through this contact and emitted light propagates in a volume under the contact pad.

The contacts 105, 110, 115 are not necessarily of identical composition. The selection of the contact compositions strongly depends on whether the topmost layer under the each of the contacts is n or p type and on the material composition of the underlying semiconductor layer. For example, if the underlying semiconductor layer under the contact is n-GaAs, then the Schottky contacts 105, 110 may be a stack of Ti (5 nm) and Au (300 nm) and the low resistivity waveguide contact may be alloyed AuGe (88% and 12% weight percent ratio, respectively) to form a low resistivity alloyed contact. Backside 125 contact can also be an alloyed AuGe contact. If the underlying material is p-GaAs, hen suitable materials for high resistivity Schottky contacts are, for example, Ag, Au, and/or Hf, whereas low resistivity contact may be formed by an alloyed InAu (80%-20%, weight percent ratio, respectively) contact. The high resistivity contact is created due to the potential barrier formation at the metal-semiconductor interface. The barrier height is determined by metal work-function and the density of semiconductor surface states. The low resistive ohmic contact requires a high doping concentration in the semiconductor, as well as a low barrier height. The latter is usually difficult to ensure, thus various techniques, such as alloyed contacts, where, for example, AuGe diffuses into semiconductor, ion implantation or other techniques are preferably used.

An electrical contact to the semiconductor substrate can be formed on the backside 125 of the substrate 100 by depositing a metal layer on the substrate backside by electron beam deposition, magnetron sputtering, or other conventional techniques well known to people skilled in the art. An example of a suitable metal for the metal layer is, e.g., AuGe (88% and 12% weight percent mixture) alloyed contact, etc.

In some embodiments (not shown), an electrical substrate contact may include a metal filled via terminating at the frontside of the semiconductor substrate.

The optical resonator for device 10 is formed by cleaving the structure to form cleaved facets 130. To prevent self-lasing, at least one anti-reflective coating 135 with sufficiently low reflectivity is formed on one of the cleaved facets 130. The coating 135 may have a power reflectivity of less than $1\times10^{-2}$. The anti-reflective coating 135 may be made of a dielectric material, such as $SiO_2$ or $Al_2O_3$ or a semiconductor material such as Si or ZnSe. Standard techniques for depositing coating, such as magnetron sputtering, e-beam deposition or molecular beam epitaxy, can be used. The reflectivity is tuned by precisely adjusting the thickness of a dielectric or a semiconductor in employing quarter-wave coatings (one or multi-layer stack) and utilizing the destructive interference effects for a desired central wavelength. Typical dielectric layer thicknesses are of the order of a quarter of a wavelength and also depend on the refractive index of the material. The power reflectivities of the device can be measured after fabrication by the Kaminow method. See Vizbaras, K., Dvinelis, E. Š., Trinkūnas, A., Songaila, R., Žukauskas, T., Kaušylas, M., & Vizbaras, A. (2015) "High Power Continuous Wave GaSb-based Superluminescent diodes as gain chips for widely tunable laser spectroscopy in the 1.95-2.45 um wavelength range," *Applied Physics Letters* Vol. 107 (1), 011103-01107. The other cleaved facet 130 is also passivated with an optical coating 140, which can be highly reflective or anti-reflective, as long as self-lasing is prevented. A highly reflective coating can be achieved with a technique identical to that of fabrication of an anti-reflective coating, only the quarter-wavelength stack is preferably optimized for constructive interference, to increase reflectivity.

A possible practical example is as follows. The examples of the substrate, epitaxial layers, and contact layers are merely illustrative; many other material combinations and fabrication methods may be used, as one of skill in the art will readily recognize.

An n-doped ($5\times10^{17}$ $cm^{-3}$ Te doped) GaSb substrate (100) is provided, on which a gain region with a plurality of epitaxial layers 120 is formed by molecular bean epitaxy. Some of the epitaxial layers include dopants to aid electrical transport of carriers, as well as an active region 145. The epitaxial layers 120 can include alloys such as AlGaAsSb, GaInAsSb, GaSb, AlAsSb, etc. and dopants such as Be, Te, Si, etc.

On top of the epitaxial layer stack, contacts including first and second Schottky contacts 105, 110 and a low resistivity waveguide contact 115 can be deposited by electron beam evaporation. Different metal materials may be chosen to create desired resistivities, when designing contact resistivities (no less than $1\times10^{-3}$ $\Omega cm^2$ and no more than $5\times10^{-3}$ $\Omega cm^2$ Schottky contact).

After cleaving the facets 130, the contacts and underlying epitaxial layers can be passivated by, e.g., magnetron sputtering or e-beam evaporation, or other techniques to deposit a dielectric material, such as $Al_2O_3$, $SiO_2$, etc. Also, semiconductor material, such as Si, ZnSe, etc. can be used for passivation and for providing the functionality of anti-reflective coating in order to suppress self-lasing. Typically, in order to suppress self-lasing, power reflectivities of anti-reflective coatings have to be less than $1\times10^{-2}$, as discussed in Vizbaras, et al., 2015. The substrate contact 125 can be deposited by e-beam evaporation, magnetron sputtering or similar techniques on the backside of the GaSb substrate. Also, the contact to the substrate can be made from top-side, by deep-etching a via down to the substrate, as shown in FIGS. 5a-5d. This way, all the electrical contacts can be realized on top.

Figure 2A:
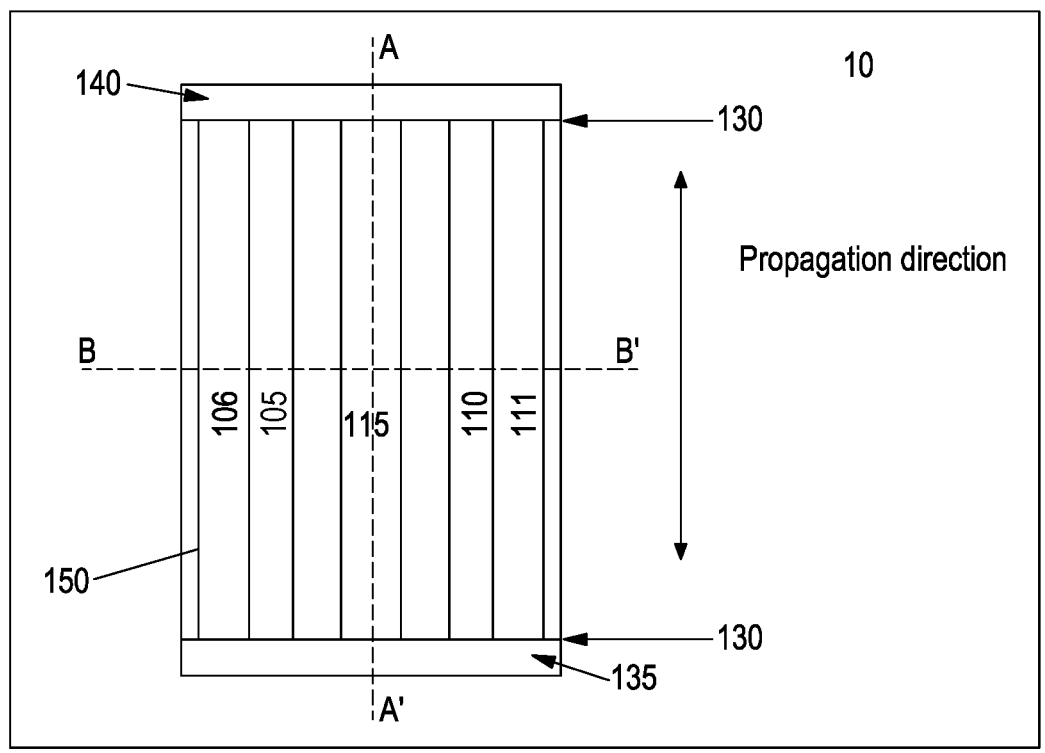
FIG. 2a is a top view of a solid-state optical device including Schottky contacts and a ridge waveguide, in accordance with an embodiment of the invention.

In some embodiments, the device 10 can also have a ridge waveguide disposed under the low resistivity waveguide contact 115. A ridge waveguide is formed by selectively removing semiconductor material on both sides of the low resistivity waveguide contact 115. Such removal is typically done by dry or wet chemical etching, or a combination of both. In a quasi-index guided structure, the etching (material removal) is stopped before the active region in order not create surface recombination centers at the etched sidewalls. The remaining epitaxial layer stack is denoted 122, i.e., gain medium 122. Referring to FIG. 2a, first and second Schottky (metal-semiconductor) contacts are disposed on both sides of the low resistivity waveguide contact 115 on top of an epitaxial layer structure, including the gain medium 122 (see FIG. 2b). Output mirror facets 130 are disposed at the interface between the semiconductor material and deposited coatings 135, 140.

Figure 2B:
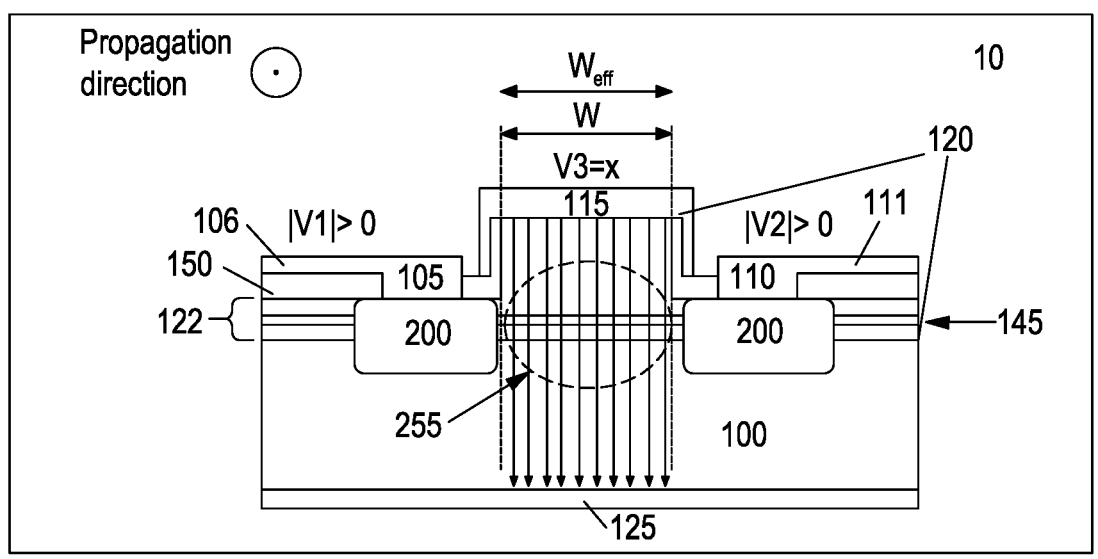
FIG. 2b is a cross-sectional view of the solid-state optical device of FIG. 2a, with reverse bias applied to the Schottky contacts, in accordance with an embodiment of the invention.

The formation of the ridge waveguide may include depositing an insulator layer 150 on the etched surface, except for areas where the low resistivity waveguide contact is disposed and the two highly resistivity contacts 105, 110 are in contact with the semiconductor layer stack. Such an insulator is needed for etched sidewall passivation and protection from the environment. The ridge waveguide formation is typically achieved by selective dry or/and wet-chemical etching of the semiconductor material on both sides of the low resistivity waveguide contact 115 to define the ridge waveguide (FIG. 2b). Etching is stopped in the proximity of the active region (i.e., proximate the active layer 145), ensuring that it is not etched through. Typically, etching is terminated 50-500 nm before the active region, but is not specifically limited to that, as long as the active layer 145, where carrier recombination takes place, is not etched through. Such a geometry leads to a quasi-index guided device structure, where the optical mode is partially guided by the index step created by etching the ridge waveguide structure and also gain-guided in the junction plane. Here, however, the first and second Schottky contact 105, 110 pads are disposed just above the active region layers 145, on the topmost epitaxial layer that remains after etching. Contact pads 106, 111 are connected to the high resistivity Schottky contacts 105, 110 and are routed over the insulator layer 150 for practical probing reasons.

The epitaxial layer stack 122 is disposed under the Schottky contacts 105, 110 in FIG. 2b. The contact pads 106, 111 are routed over the insulator layer 150 and connected to the Schottky contacts 105, 110. The overall control mechanism is identical to the aforementioned example, with the ridge-waveguide solution providing a more efficient control of depletion region 200 width (penetration into layers under the contact) and requiring less bias to ensure the depletion of active region below and reduction of lateral out-diffusion, thus reduction of astigmatism.

Arrows descending from low resistivity waveguide contact 115 to backside contact 125 show schematically the path of injected current flow from the topmost waveguide contact to the substrate contact, across the active region. The actual physical width of the low resistivity waveguide contact 115 is indicated by W, and the effective width of the current injection aperture due to lateral carrier diffusion is indicated by $W_{eff}$, which is larger than W. In the illustrated embodiment, |V1| and |V2|>0; thus, the contacts 105, 110 are under reverse bias; V3=x indicates an arbitrary forward bias value, used to drive current through the structure. The dashed ellipse 255 indicates the optical mode profile.

Referring to FIGS. 3a-3d, in another embodiment, lateral carrier diffusion is suppressed in the active region, thus reducing in-plane gain guiding and reducing astigmatism, by disposing metal-insulator-semiconductor (MIS) contacts in the proximity of the current injection aperture. This way, in contrast to the abovementioned embodiment that employed metal-semiconductor Schottky contact pads, the depletion region 200 does not form upon the formation of the MIS contact pads 205, 210. Rather, the depletion region is formed and tuned only upon application of bias. The maximum extent of the depletion region under the contact pad can range to several micrometers, depending on the doping level of the underlying semiconductor layer and intrinsic carrier concentration, as explained in detail in Sze (1981). An advantage of this approach is that upon application of DC bias to the MIS contact pads, no charge transport occurs and thus no parasitic currents flow; such parasitic currents typically decrease overall device efficiency.

Figure 3A:
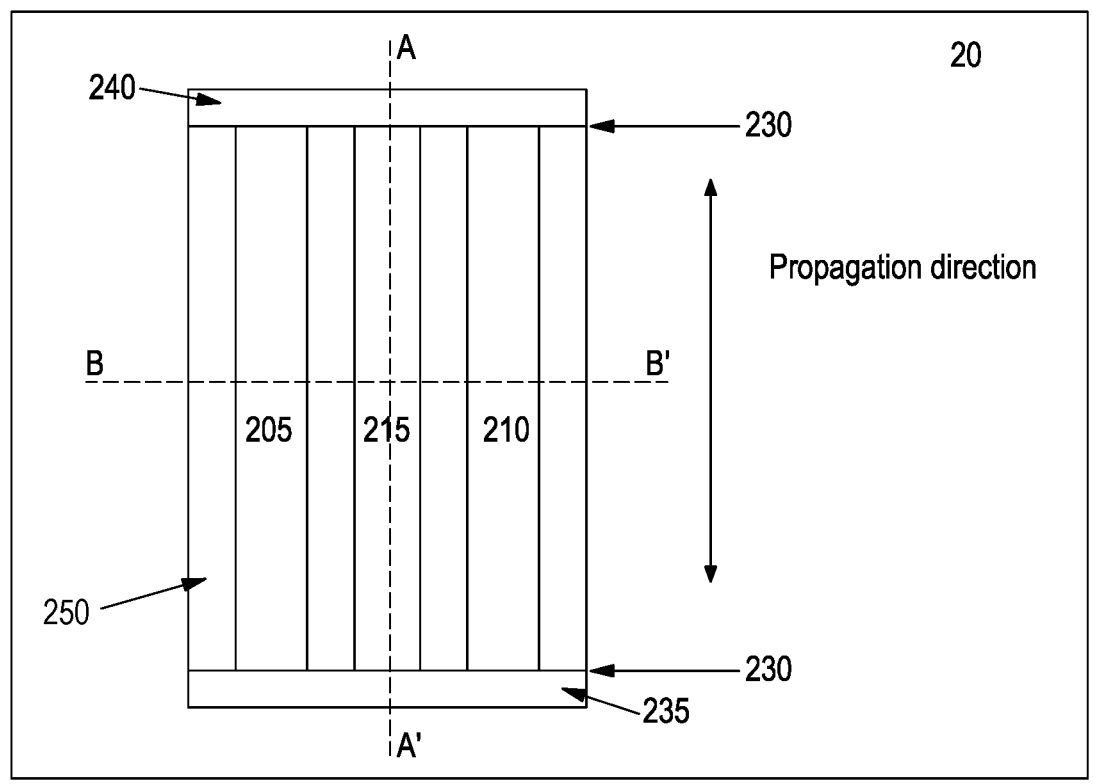
FIG. 3a is a top view of a solid-state optical device including MIS contacts, in accordance with an embodiment of the invention.

In particular, FIG. 3a is a top view of the device 20, with first and second MIS contacts 205, 210 disposed on both sides of a low resistivity waveguide contact 215 on top of a plurality of epitaxial layers 220 including the gain medium. The first and second MIS contacts 205, 210 each include metal contact pads, each forming a metal-insulator interface with insulator 250. Output mirror facets 230 are disposed at interfaces between the semiconductor material (i.e., epitaxial layer structure 220 and an underlying substrate) and deposited coatings 235, 240. AA' marks the cross-section depicted in FIG. 3b and BB' marks the cross-sections depicted in FIGS. 3c and 3d.

Figure 3B:
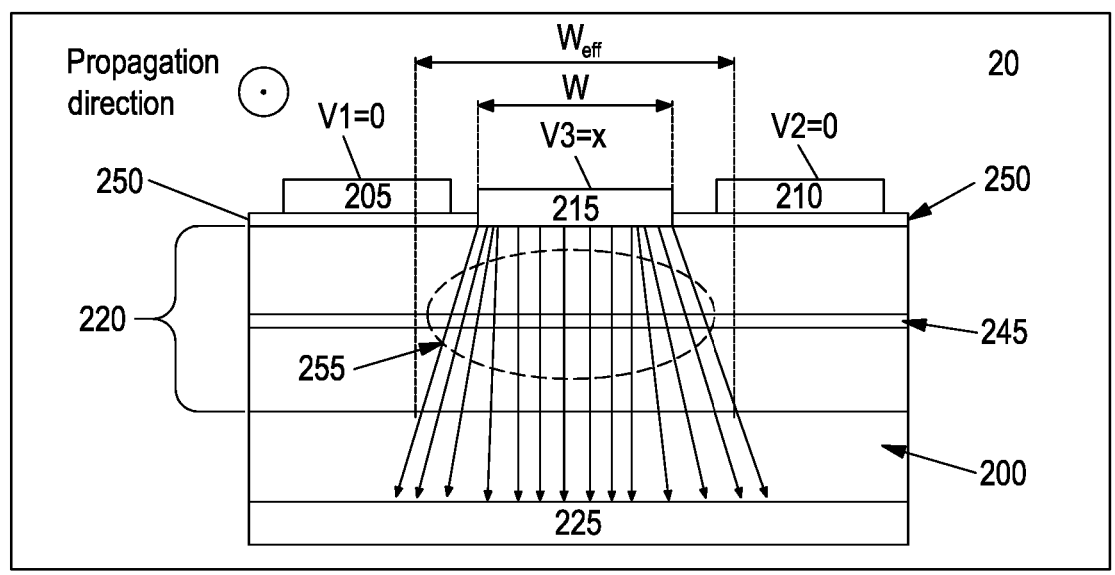
FIG. 3b is a cross-sectional view of the solid-state optical device of FIG. 3a, with no bias applied to the MIS contacts, in accordance with an embodiment of the invention.

Referring to FIG. 3b, which is a cross-sectional view AA' of device 20 of FIG. 3a, the plurality of epitaxial layers 220 are disposed on a substrate 200. The epitaxial layers 220 include an active region 245. A backside substrate contact 225 is disposed on a backside of the substrate 200. Coatings 235, 240 are disposed on the cleaved output facets 230. The low resistivity waveguide contact 215 is disposed over the epitaxial layers 220.

Arrows descending from the low resistivity waveguide contact 215 to backside contact 225 show schematically the path of injected current flow from the topmost waveguide contact into substrate contact, across the active region. The actual physical width of the low resistivity waveguide contact 215 is indicated by W, and the effective width of the current injection aperture due to lateral carrier diffusion is indicated by $W_{eff}$, which is larger than W. V1 and V2=0, which indicates the situation under 0 V bias to the contacts 105, 110'; V3=x indicates an arbitrary forward bias value, used to drive current through the structure. The dashed ellipse 255 indicates the optical mode profile. The absence of depletion regions under 0 V is also apparent.

Figure 3C:
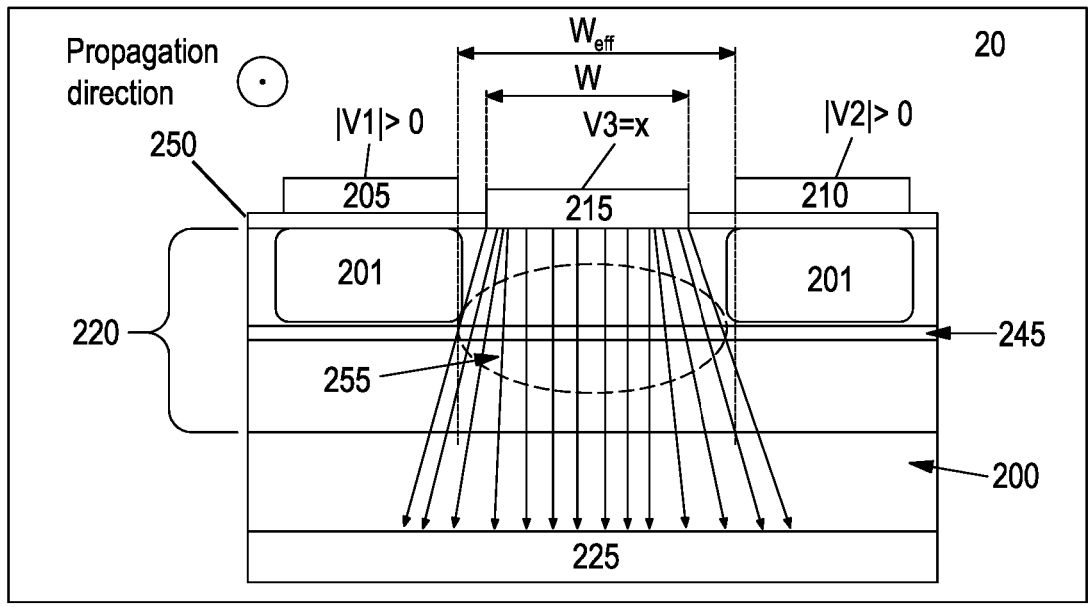
FIG. 3c is a cross-sectional view of the solid-state device of FIG. 3a, with a bias applied to the MIS contacts, in accordance with an embodiment of the invention.

Referring to FIG. 3c, which is a cross-sectional view BB' of the device 20 of FIG. 3a, first and second MIS contacts 205, 210 are disposed on both sides of the low resistivity waveguide contact 215. Upon the application of a bias (V1 and V2) to the metal contact pads of the MIS contacts 205, 210, depletion regions 201 form below the first and second MIS contacts 205, 210, respectively. The bias polarity depends on the semiconductor type below the insulator layer. For n-type semiconductor, the polarity is negative, and for p-type semiconductor the polarity is positive. The position of depletion regions between the insulator 250 and the active region 245 is merely illustrative, indicating that the depletion region width may be continuously tuned from the MIS structure to the maximum possible depletion layer width, limited by the onset of inversion at the insulator-semiconductor interface.

In FIG. 3c, arrows descending from waveguide 215 to the backside contact 225 show a schematic path of injected current flow from top-most waveguide contact and into the substrate contact, across the active region 245. The actual physical width of the low resistivity waveguide contact 215 is indicated by W, and effective width of the current injection aperture due to lateral carrier diffusion is indicated by $W_{eff}$, which is larger than W. An arbitrary forward bias value V3=x is used to drive current through the structure. A dashed ellipse 255 indicates the optical mode profile.

Figure 3D:
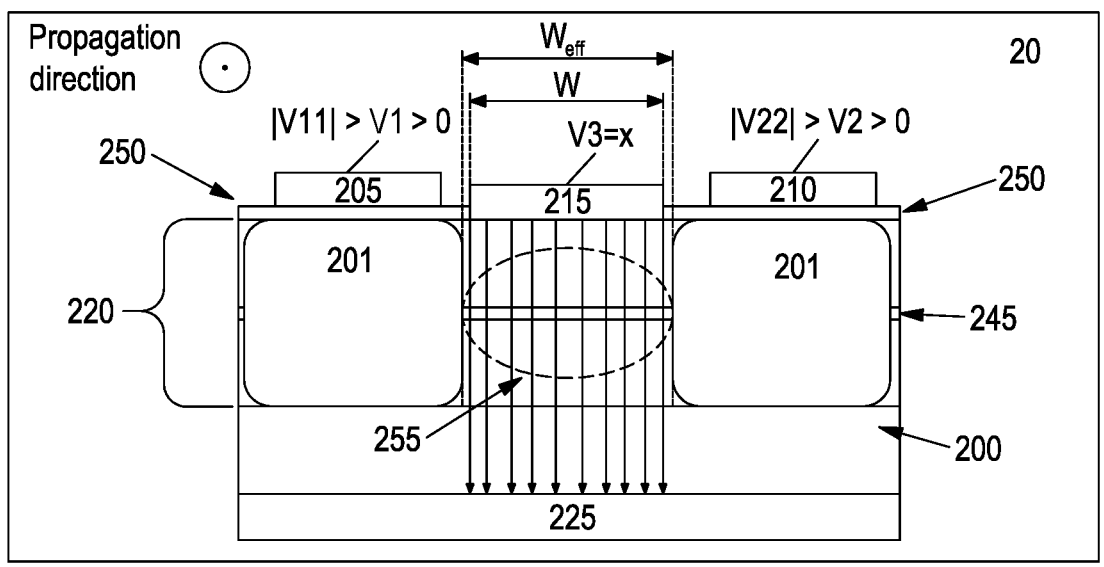
FIG. 3d is a cross-sectional view of the solid-state device of FIG. 3a, with sufficient bias applied to the MIS contacts to increase the depletion region width across the active region and reduce lateral carrier out-diffusion and current spreading effects, in accordance with an embodiment of the invention.

Like FIG. 3c, FIG. 3d is a cross-sectional view BB' of the device 20 of FIG. 3A, distinguished in that a sufficient bias is applied to the metal contact pads of the MIS contacts 205, 210 to increase the depletion regions 201 width across the active region 245. The bias also reduces lateral carrier out-diffusion and current spreading effects. This is illustrated schematically with arrows descending from waveguide 215 to the backside contact 225, with effective current aperture width $W_{eff}$ coinciding with actual physical width W of the low resistivity waveguide 215, under certain bias V11 and V22, which have the same polarity as V1 and V2, but with bigger modulus. The dashed ellipse 255 indicates the optical mode profile.

As in the case of the Schottky contacts, tuning the width of each depletion region in the devices with MIS contacts also locally changes a carrier distribution under the waveguide metal contact pad. Changing the carrier distribution may change the refractive index, optical mode profile, and/or loss of the volume of the epitaxial layers through which the emitted light propagates. If depletion regions from both sides of the waveguide contact extend into the active region layer stack, carriers injected there face a potential barrier, hindering out-diffusion. Thus, gain-guiding in the in-junction plane is reduced, thereby reducing the astigmatism.

The structure with MIS contact pads may be fabricated as follows. A semiconductor substrate 200 is provided. The semiconductor substrate 200 may be, for example, GaAs, GaSb, InP or any other suitable semiconductor material. A plurality of epitaxial III-V semiconductor layers 220 are formed over the semiconductor substrate. Some of these layers are intentionally doped with dopants. Also included is the active region 245 with at least one layer in which carrier generation-recombination occurs and light is produced. These epitaxial layers may be formed by standard epitaxial growth techniques, such as molecular beam epitaxy, etc. These layers 220 constitute a gain region that can be further processed by typical semiconductor fabrication techniques into a device with defined beam propagation direction in-plane with epitaxial layers. During the fabrication steps insulator deposition takes place, typically by magnetron sputtering, plasma enhanced chemical vapor deposition (PECVD) or other techniques. Contact geometry is defined by standard lithographical techniques and, on top of a deposited insulator layer 250, metal deposition takes place and MIS contacts 205, 210 are formed. Prior to forming the low resistivity waveguide contact 215, insulator 250 is etched away, so that current may be passed through efficiently under applied bias. The substrate contact 225 is disposed either on the backside of the substrate or is a via from top to the substrate formed by means of etching, with the contact being routed to a pad on a topside of the wafer (see FIGS. 5a-5d and related text below).

Figure 4:
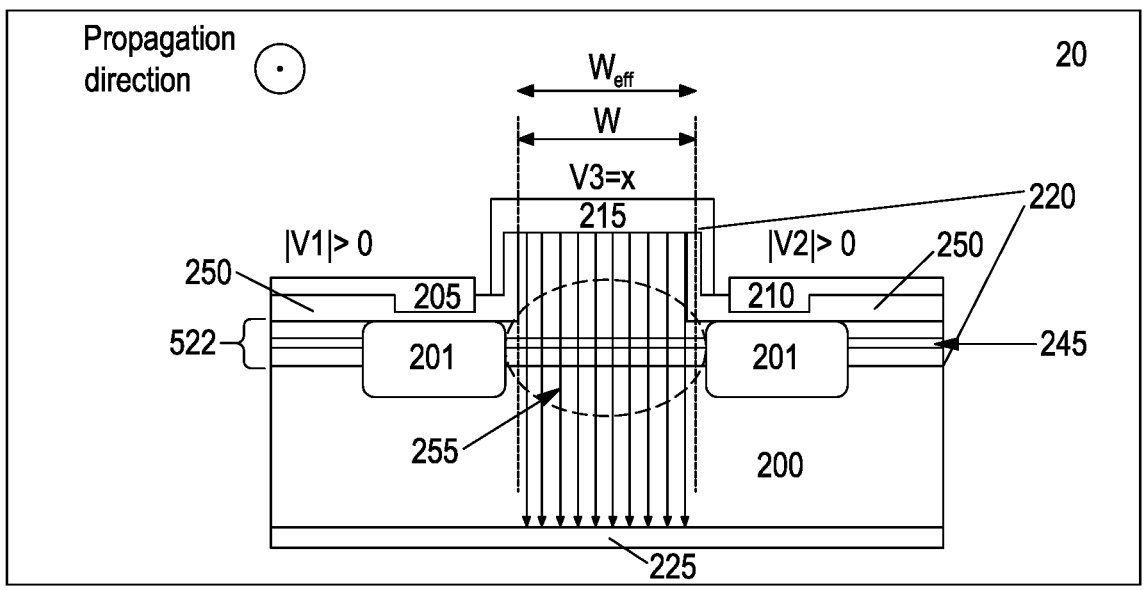
FIG. 4 is a cross-sectional view of a solid state optical device including Schottky contacts and a solid-state gain medium including a ridge disposed under the waveguide metal contact pad.

Referring to FIG. 4, similarly as has been described above for Schottky contacts, a ridge can also be disposed under the low resistivity waveguide contacts in a structure with MIS contacts, i.e., the solid-state gain medium may include a ridge disposed under the waveguide metal contact pad. The main difference from the Schottky contact case is that here, insulator layer 250 extends under the metal pads 205, 210, between the metal pads and the epitaxial layers. This insulator layer under the metal of pads 205, 210 can be, optionally, of a different thickness than elsewhere in the structure. Having a ridge disposed by selectively removing material on both sides of the low resistivity waveguide contact by same means as for the Schottky barrier example, provides identical benefits as in the Schottky contact case, described earlier. A portion of the epitaxial layers above the active region 245 may be removed proximate the waveguide contact, with MIS contacts 205, 210 being formed over the reduced epitaxial layer regions. Thereby, having MIS contacts 205, 210 closer to the active region 245 allows for more efficient control of the depletion region 201 below the contacts and less bias is needed to deplete the active region, thus more efficiently reducing the lateral carrier out-diffusion and limiting gain-guiding in-junction plane, thus reducing astigmatism. In the illustrated embodiment, MIS contacts 205, 210 are under reverse bias, i.e., |V1| and |V2|>0. V3=x indicates an arbitrary forward bias value, used to drive current through the structure. The dashed ellipse 255 indicates the optical mode profile.

Figure 5A:
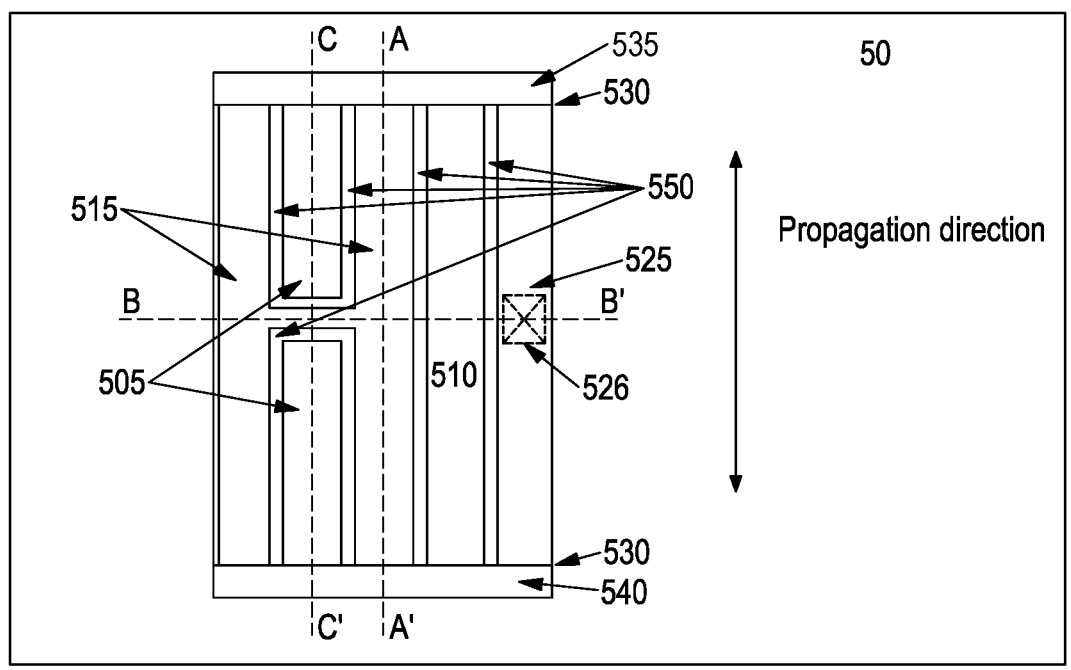
FIG. 5a is a top view of a solid-state optical device including MIS contacts, in accordance with an embodiment of the invention.

Substrate contacts can be configured as follows. Referring to FIG. 5a, in some embodiments of the invention, all contacts are routed to the frontside of the device. In the illustrated embodiment, in device 50, first and second MIS contacts 505, 510 are disposed on both sides of the low resistivity waveguide contact 515 on top of an epitaxial layer structure 520 including the gain medium. Insulator layer 550 is disposed under the contacts 505, 510, 515. Output mirror facets 530 are shown with an arrow, at the interface between the semiconductor material and deposited coatings 535, 540. AA' marks the cross-section depicted in FIG. 5b, BB' marks the cross-sections depicted in FIG. 5c and CC' marks the cross-section depicted in FIG. 5d. A substrate contact 525 is routed to the frontside of the device through a via 526.

Figure 5B:
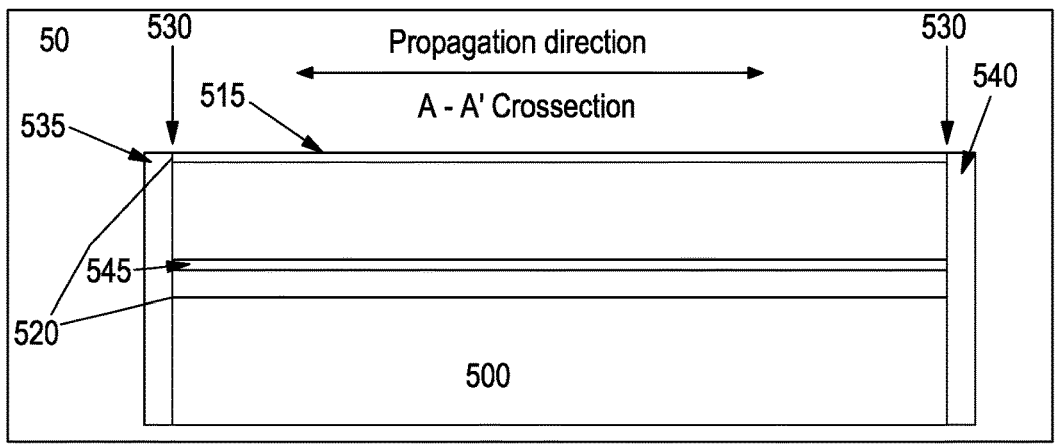
FIG. 5b is a cross-sectional view of the solid-state optical device of FIG. 5a, in accordance with an embodiment of the invention.

FIG. 5b is the AA' cross-sectional view of device 50. The device 50 includes substrate 500, the epitaxial layer stack 520 under the low resistivity waveguide contact 515, and active region 545. Output mirror facets 530 are disposed at the interface between the semiconductor material and deposited coatings 535, 540.

Figure 5C:
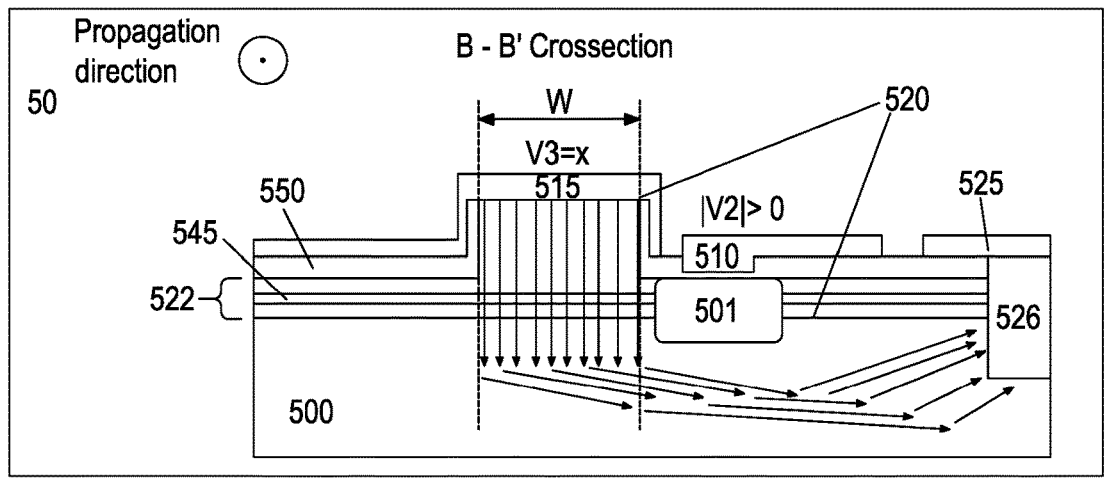
FIG. 5c is a second cross-sectional view of the solid-state optical device of FIG. 5a, illustrating a metal filled via terminating at the frontside of the semiconductor substrate, in accordance with an embodiment of the invention.

FIG. 5c is the BB' cross-sectional view of device 50, with all contacts are routed to the frontside. The device 50 includes the substrate 500, epitaxial layer stack 520 under the low resistivity waveguide contact 515, epitaxial layers 522 that remain after etching of the ridge and which sit under the MIS contacts 505, 510, and active region 545. A metal via 526 extends from the substrate 500 to a substrate contact pad 525 on the frontside. A depletion region 501 forms under bias, created by applying bias to the MIS contact 510. Insulator layer 550 is deposited on the semiconductor surfaces. W indicates the effective current aperture width, which coincides with the physical aperture width when the depletion regions 501 block the lateral carrier out-diffusion.

Figure 5D:
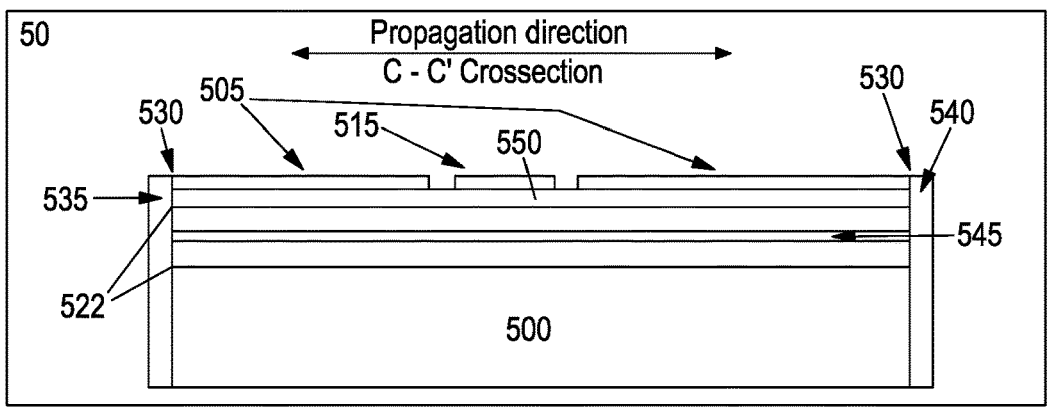
FIG. 5d is a third cross-sectional view of the solid-state optical device of FIG. 5a, illustrating the device topside of a device including a metal filled via terminating at the frontside of a semiconductor substrate, in accordance with an embodiment of the invention.

FIG. 5d is the CC' cross-sectional view of device 50, with all contacts routed to the frontside. This illustrates one of many possible ways that low resistivity contact 515 may be routed to the contact pad across MIS contact 505. Here, the device includes the active region 545, substrate 500, the epitaxial layer stack 522 that remains under MIS contacts after formation of the ridge, output mirror facets 530, optical coatings 535, 540, and insulator layer 550.

Figure 6A:
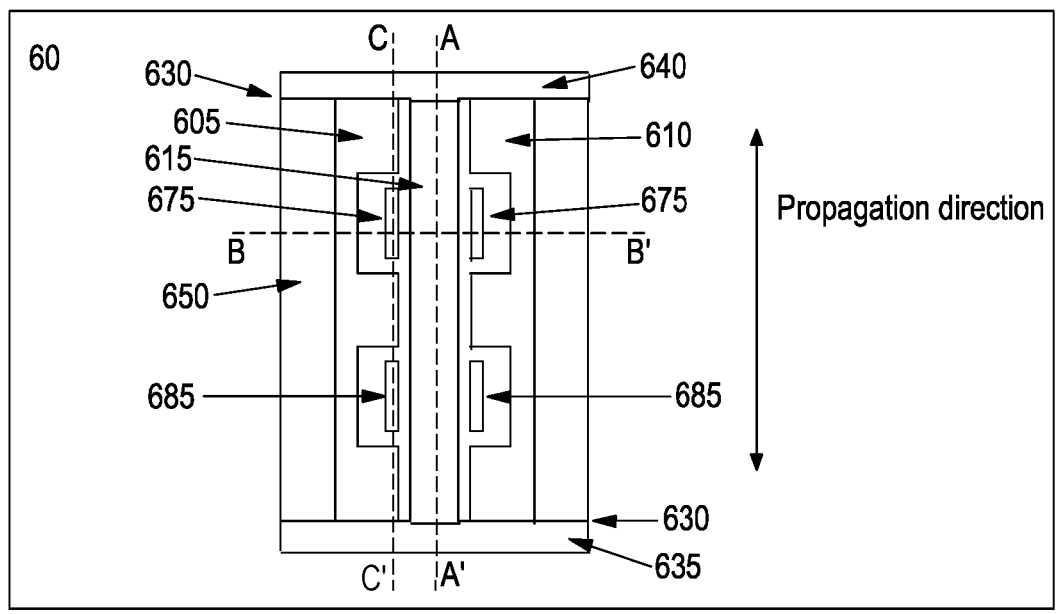
FIG. 6a is a top view of a solid-state optical device including optically lossy structures, in accordance with an embodiment of the invention.
Figure 6B:
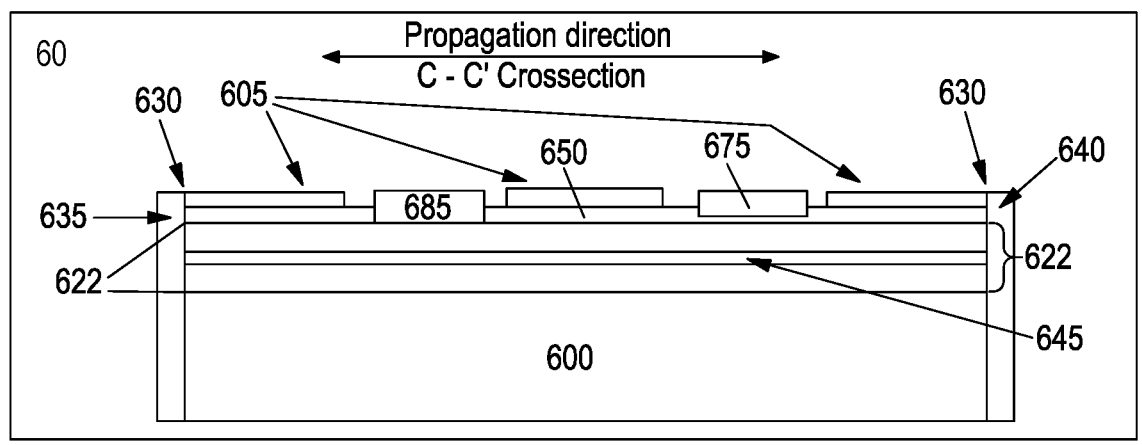
FIG. 6b is a cross-sectional view of the solid-state optical device of FIG. 6a, in accordance with an embodiment of the invention.
Figure 6C:
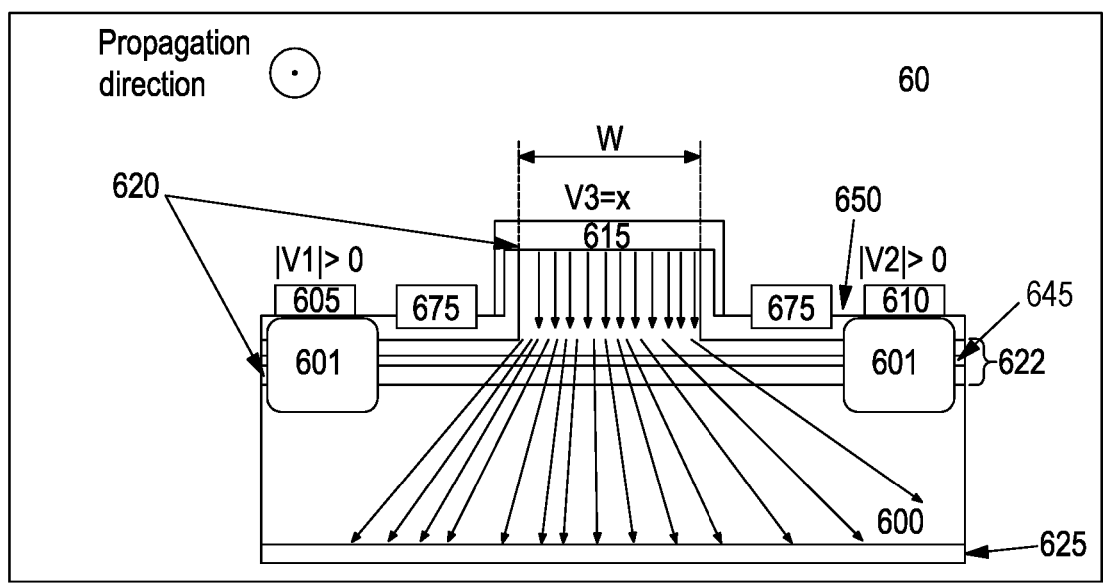
FIG. 6c is a second cross-sectional view of the solid-state optical device of FIG. 6a, in accordance with an embodiment of the invention.

Moreover, in addition to the aforementioned examples, embodiments of the invention include devices that include specific structures in combination with Schottky and/or MIS contacts or alone, next to the low resistivity waveguide contact. Such specific structures are intentionally made lossy for the optical mode, either due to free-carrier inhibited losses in the metal or doped semiconductor, where the optical field still penetrates, or losses due to scattering at a rough interface, or a combination of both. The simplest form of such optically lossy structures is depicted in FIGS. 6a-6c in combination with MIS contacts for tuning the depletion region. The device 60 includes MIS contacts 675, but without any applied bias. If the insulator layer 650 is thin enough and the MIS contacts 675 are close enough to the low resistivity waveguide contact 615, where the optical mode propagates, the optical field also leaks partially into the optically lossy structures, i.e., the MIS contacts 675 on the sides of the ridge and the inhibited loss reduce the in-junction plane gain directly under such structures, leading to reduced astigmatism. A very similar narrative applies to the lossy unbiased structures 685 created by directly putting metal into contact with semiconductor (see FIGS. 6a-6c). Here also the optical mode experiences loss due to free-carrier absorption, and gain (including in-plane gain) is reduced directly under the structure, thus reducing astigmatism. In various embodiments, the optically lossy structure may be a doped non-metal structure, a metal structure, an intentionally rough surface, and/or a metal-insulator-semiconductor structure. The loss mechanism is also not limited to free-carrier absorption, but can be caused by intervalence band absorption, scattering, etc.

In particular, referring to FIG. 6a, which is a top view of the device 60, device 60 includes optically lossy structures 675, 685 disposed on both sides of the low resistivity waveguide contact 615 in combination with MIS contacts 605, 610, also disposed on both sides of the ridge. Insulator layer 650 is disposed over semiconductor surfaces. Lossy structure 675 is formed by fabricating an MIS contact on top of the topmost epitaxial layer next to the waveguide contact 615. No bias is applied to the MIS contact of the lossy structure 675. An optical mode propagating in the device leaks to the lossy structure 675 and experiences loss due to free-carrier absorption in the metal layer of the lossy structure; thus gain under the lossy structure is reduced. Lossy structure 685 is a similar optically lossy structure formed by disposing metal structures directly on the topmost semiconductor layer. This way, if bias to the metal structure is not applied, an optically lossy structure is also formed, which reduces gain in the epitaxial layer below due to free-carrier absorption. Device 60 includes cleaved output mirror facets 630 with optical coatings 635, 640 disposed on the facets. AA' marks the cross-section of the device, which is functionally identical to the one depicted in FIG. 5b. CC' is a device cross-section depicted in FIG. 6b, where more details about lossy structures 675, 685 are provided. In general, device 60 is a structure with a combination of optically lossy structures and structures with tunable depletion regions that are disposed on both sides of the low resistivity waveguide contact. The structure of device 60 is not limited to the exact combination shown in FIGS. 6a-6c and may include various optically lossy structures, such as a non-metal structure, a metal structure, an intentionally rough surface, or a metal-insulator-semiconductor structure.

Referring to FIG. 6b, cross-section CC' of device 60 illustrates the semiconductor substrate 600, and the epitaxial layer stack 622 that remains after formation of the ridge on both sides of the low resistivity waveguide contact 615 (see FIG. 6a, 6c). Insulator layer 650 is disposed on top of the semiconductor layers. MIS contact 605 tunes the depletion region next to the ridge. The optically lossy unbiased metal-semiconductor structure 685 and the unbiased optically lossy MIS structure 675 are disposed next to the waveguide contact 615. The active region 645 is disposed in the epitaxial layer stack 622. The device 60 includes output mirror facets 630, and optical coatings 635, 640 disposed on the mirror facets.

Referring to FIG. 6c, cross-section BB' of device 60 illustrates MIS optically lossy structures 675 disposed on both sides of the ridge with low resistivity waveguide contact 615, as well as biased MIS contacts 605, 610 for tuning the depletion region width. The insulator layer 650 is disposed on the semiconductor layers. Depletion regions 601 form under the tunable MIS contacts 605, 610. Active region 645 is disposed in the epitaxial layer stack 622 that remains after selectively removing the material for ridge formation next to the low resistivity waveguide contact 615. A substrate contact 625 to the substrate 600 is provided. Arrows schematically depict current flow across the structure and ridge width W is defined by contact 615 geometry.

Figure 7:
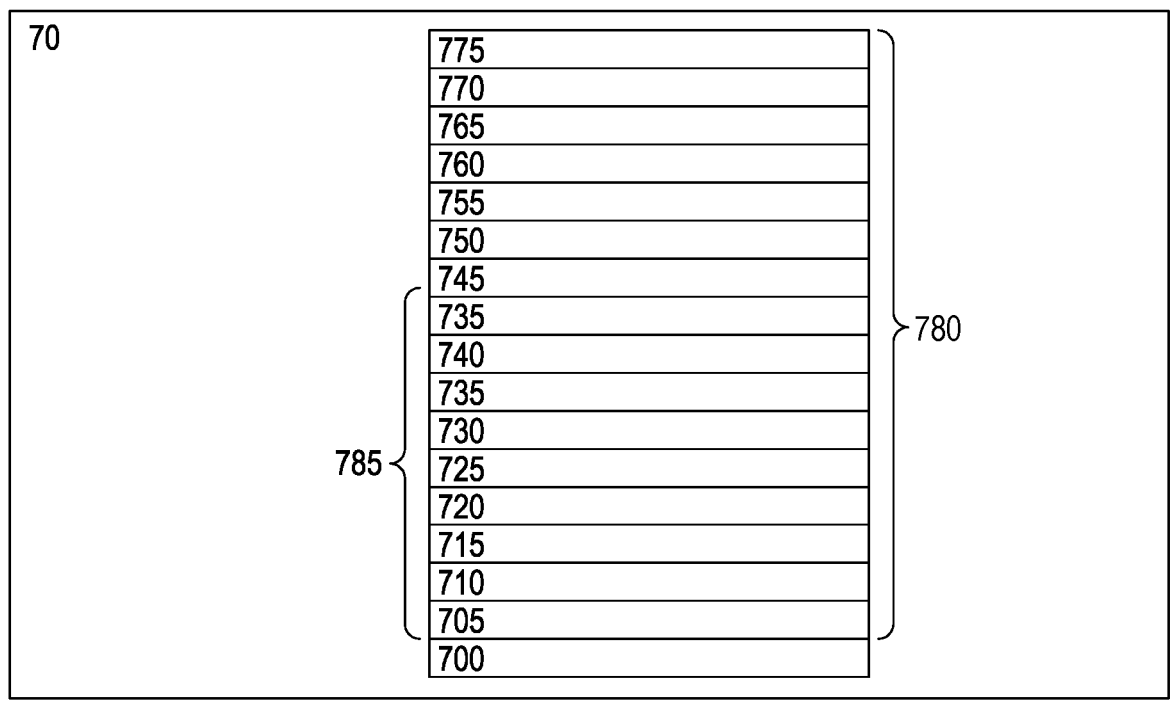
FIG. 7 is a cross-sectional view of an example of an epitaxial layer structure suitable for incorporation in solid-state optical devices, in accordance with embodiments of the invention.

Referring to FIG. 7, an exemplary semiconductor epitaxial layer structure 70 is illustrated, which can be formed by, e.g., MBE. This layer structure may be used in various embodiments of the invention, and is described solely to provide an example of a plurality of epitaxial layers that may be utilized in the devices described herein. One of skill in the art would readily understand that many other layer structures for optoelectronic may be incorporated into the described devices.

The layer structure may be formed on a GaSb substrate 700, doped with Te to the level of $5 \times 10^{17}$ cm$^{-3}$. The layer structure includes an epitaxial GaSb buffer layer 705 (thickness of 1000 nm), doped to the nominal level of $3 \times 10^{18}$ cm$^{-3}$, disposed over the substrate and followed by a 60 nm thick quaternary $Al_xGa_{1-x}As_ySb_{1-y}$ graded layer 710 with a linearly graded composition ($0<x<0.45$, $0<y<0.042$). An outer cladding layer 715 with 1500 nm of highly Te doped (nominally $3 \times 10^{17}$ cm$^{-3}$) quaternary $Al_{0.45}Ga_{0.55}As_{0.04}Sb_{0.96}$ is disposed on the graded layer 710, followed by a cladding layer 720 of 700 nm of $Al_{0.45}Ga_{0.55}As_{0.04}Sb_{0.96}$ with a lower doping level ($1.2 \times 10^{17}$ cm$^{-3}$). The latter is followed by a graded layer 725 of 100 nm thick, lightly doped (Te nominally doped to the level of $5 \times 10^{16}$ cm$^{-3}$) quaternary $Al_xGa_{1-x}As_ySb_{1-y}$, where Al and As content is linearly graded from 0.45 to 0.25 and from 0.04 to 0.02, respectively. After graded layer 725, the inner waveguide layer 730 is disposed, s made from 370 nm thick quaternary $Al_{0.25}Ga_{0.75}As_{0.02}Sb_{0.98}$, nominally undoped material. This is followed by 11 nm thick $Ga_{0.73}In_{0.27}As_{0.04}Sb_{0.96}$ quantum well layer 735, where carrier recombination takes place, followed by a 20 nm thick barrier layer 740 of the same material composition as the inner waveguide layer 730, followed by a second 11 nm thick $Ga_{0.73}In_{0.27}As_{0.04}Sb_{0.96}$ quantum well layer 735. Above that is disposed a 370 nm thick p-side inner waveguide layer 745, composed of nominally undoped $Al_{0.25}Ga_{0.75}As_{0.02}Sb_{0.98}$, over which a 100 nm thick, Be-doped ($5 \times 10^{16}$ cm$^{-3}$) quaternary $Al_xGa_{1-x}As_ySb_{1-y}$ graded layer 750 with a linearly graded composition ($0.25<x<0.45$, $0.02<y<0.042$) is disposed. The graded layer 750 layer is followed by 700 nm thick p-side outer cladding layer 755 of $Al_{0.45}Ga_{0.55}As_{0.04}Sb_{0.96}$ doped with Be to the level of $1 \times 10^{17}$ cm$^{-3}$, and a 500 nm thick higher Be doped ($1 \times 10^{18}$ cm$^{-3}$) $Al_{0.45}Ga_{0.55}As_{0.04}Sb_{0.96}$ cladding layer 760 and, finally, by 1000 nm of highest doped ($5 \times 10^{18}$ cm$^{-3}$) cladding layer 765. This is followed by 60 nm of highly Be doped ($5 \times 10^{18}$ cm$^{-3}$) graded $Al_xGa_{1-x}As_ySb_{1-y}$ ($0.45>x>0$, $0.04>y>0$) graded layer 770. The overall structure is finalized with a 200 nm thick highly Be doped ($1 \times 10^{19}$ cm$^{-3}$) GaSb contact layer 775.

The devices 10, 20, 50 all include epitaxial layer structures the same as or similar to the epitaxial layer structure 70. The complete layer stack 780 in FIG. 7 is an example of the configuration of the initially formed epitaxial layer stacks 120, 220, 520, 620, whereas the partial layer stack 785 is an example of a stack that remains after etching for a ridge-waveguide structure.

In some embodiments, the optical devices 10, 20, 50 may be modified as follows. After fabrication of the optical device, the semiconductor substrate is removed from the backside of the initial epitaxial layer stack, e.g., layer stack 70, by mechanical grinding, chemical etching or a combination of mechanical-chemical polishing. Accordingly, the semiconductor may act as a mechanical holder during fabrication as well as serve to define the lattice constant of the epitaxial layers grown on top, but then may be removed from the optical device. In such embodiments, an electrical contact is not disposed on a substrate or connected to a substrate; rather, the electrical contact is in contact with an epitaxial layer having an electrical conductivity type opposite to that of the topmost epitaxial layer beneath the waveguide low resistivity metal contact pad, and located on a side of the active region distal from that of the topmost epitaxial layer directly beneath the waveguide low resistivity metal contact pad. For example, in the stack 70 in FIG. 7, this would correspond to a contact pad disposed on or connected by a metal via or other conducting path to any of the layers 705, 710, 715, 720, 725, or 730. A suitable electrical contact may be same or similar to the low resistivity waveguide contact described for device 10 above. For example, the electrical contact may be made of AuGe (88% and 12% weight percent ratio, respectively) to form a low resistivity alloyed contact.

The aforementioned specific optical device arrangements are only a few examples of the many possible embodiments of the invention. The described embodiments of the invention are intended to be merely exemplary and numerous variations and modifications will be apparent to those skilled in the art. All such variations and modifications are intended to be within the scope of the present invention as defined in the appended claims.

What is claimed is:

1. A solid-state optical device comprising:
(i) a semiconductor substrate;
(ii) a solid-state gain medium disposed on a frontside of the semiconductor substrate and comprising a plurality of epitaxial layers including (a) a plurality of dopants and (b) an active region comprising at least one active layer configured to allow carrier recombination and light generation, the solid-state gain medium configured to emit light with a beam propagation direction;
(iii) a waveguide low resistivity metal contact pad disposed over and in contact with a portion of a topmost epitaxial layer of the plurality of epitaxial layers, wherein during operation carriers flow and the emitted light propagates in a volume of the epitaxial layers disposed under the waveguide metal contact pad;
(iv) a first and second Schottky contact comprising, respectively, a first and a second metal contact pad disposed near the waveguide metal contact pad, each of the first and second metal contact pads being in contact with a respective portion of a top epitaxial layer of the plurality of epitaxial layers disposed directly thereunder;
(v) an electrical substrate contact in contact with the semiconductor substrate;

(vi) at least one output mirror defined by a cleaved edge of the plurality of epitaxial layers; and (vii) an anti-reflective coating disposed on the at least one output mirror, the anti-reflective coating being configured to prevent self-lasing, wherein (a) a depletion region is disposed in the epitaxial layers under each of the first and second metal contact pads, extending from the first and second metal contact pads to the active region, (b) application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad, (c) a width of each depletion region is tunable by varying the bias to the first and second metal contact pads, (d) tuning the width of each depletion region changes an effective waveguide width under the waveguide metal contact pad and creates a potential barrier for lateral diffusion of carriers injected via the waveguide low resistivity metal contact pad, and (e) the beam propagation direction is in-plane with the plurality of epitaxial layers.

2. The device of claim 1, wherein tuning the width of each depletion region locally changes a carrier distribution under the waveguide metal contact pad.

3. The device of claim 1, wherein the electrical substrate contact comprises a metal layer disposed on a backside of the semiconductor substrate.

4. The device of claim 1, wherein the electrical substrate contact comprises a metal filled via terminating at the frontside of the semiconductor substrate.

5. The device of claim 1, wherein each of the Schottky contacts is highly resistive.

6. The device of claim 1, wherein the solid-state gain medium comprises a ridge disposed under the waveguide metal contact pad.

7. The device of claim 1, wherein the substrate and the gain medium each comprise a III-V semiconductor material.

8. The device of claim 1, wherein the anti-reflective coating has a power reflectivity of less than $1\times10^{-2}$.

9. The device of claim 1, wherein the anti-reflective coating comprises at least one of a dielectric material or a semiconductor material.

10. A solid-state optical device comprising:
(i) a semiconductor substrate;
(ii) a solid-state gain medium disposed on a frontside of the semiconductor substrate and comprising a plurality of epitaxial layers including (a) a plurality of dopants and (b) an active region comprising at least one active layer configured to allow carrier recombination and light generation, the solid-state gain medium configured to emit light with a beam propagation direction;
(iii) a waveguide low resistivity metal contact pad disposed over and in contact with a portion of a topmost epitaxial layer of the plurality of epitaxial layers, wherein during operation carriers flow and the emitted light propagates in a volume of the epitaxial layers disposed under the waveguide low resistivity metal contact pad;
(iv) a first and second metal-insulator-semiconductor (MIS) contact comprising, respectively, a first and a second metal contact pad disposed near the waveguide low resistivity metal contact pad, each of the first and second metal pads being disposed over an insulator layer in contact with a respective portion of a top epitaxial layer of the plurality of epitaxial layers disposed directly thereunder;
(v) an electrical substrate contact in contact with the semiconductor substrate;
(vi) an output mirror defined by a cleaved edge of the plurality of epitaxial layers; and
(vii) an anti-reflective coating disposed on the output mirror, the anti-reflective coating being configured to prevent self-lasing, wherein (a) applying a bias to the first and second metal contact pads creates a depletion region in the epitaxial layers directly under each of the first and second metal contact pad, extending from the first and second metal contact pads to the active region, (b) application of a forward bias to the waveguide low resistivity metal contact pad and application of a separate bias to the first and second metal contact pads modifies the depletion regions in the epitaxial layers under each of the first and second metal contact pads and the carriers are injected via the waveguide low resistivity metal contact pad, (c) a width of each depletion region is tunable by varying the bias to the first and second metal contact pads, (d) tuning the width of each depletion region changes an effective waveguide width under the waveguide metal contact pad and creates a potential barrier for lateral diffusion of carriers injected via the waveguide low resistivity metal contact pad, and (e) the beam propagation direction is in-plane with the plurality of epitaxial layers.

11. The device of claim 10 wherein the insulator layer comprises at least one of an oxide or a nitride.

12. The device of claim 10, wherein tuning the width of each depletion region locally changes a carrier distribution under the waveguide metal contact pad.

13. The device of claim 10, wherein the electrical substrate contact comprises a metal layer disposed on a backside of the semiconductor substrate.

14. The device of claim 10, wherein the electrical substrate contact comprises a metal filled via terminating at the frontside of the semiconductor substrate.

15. The device of claim 10, wherein each of the MIS contacts is insulating.

16. The device of claim 10, wherein the solid-state gain medium comprises a ridge disposed under the waveguide metal contact pad.

17. The device of claim 10, wherein the substrate and the gain medium each comprise a III-V semiconductor material.

18. The device of claim 10, wherein the III-V semiconductor material comprises at least one of Al, Ga, In, As, Sb, P, N, Bi, or alloy combinations thereof.

19. The device of claim 10, wherein the anti-reflective coating has a reflectivity of less than $1^{-2}$.

20. The device of claim 10, wherein the anti-reflective coating comprises at least one of a dielectric or semiconductor material.

21. A solid-state optical device comprising:
(i) a semiconductor substrate;
(ii) a solid-state gain medium disposed on the semiconductor substrate and comprising a plurality of epitaxial layers including (a) a plurality of dopants and (b) an active region comprising at least one active layer configured to allow carrier recombination and light generation, the solid-state gain medium configured to emit light with a beam propagation direction in-plane with the epitaxial layers;

(iii) a waveguide metal contact pad disposed over and in contact with a portion of a topmost epitaxial layer of the plurality of epitaxial layers, wherein during operation carriers flow and the emitted light propagates in a volume of the epitaxial layers disposed under the waveguide metal contact pad;

(iv) an optically lossy structure disposed near the waveguide metal contact pad;

(v) an electrical substrate contact in contact with the semiconductor substrate;

(vi) an output mirror defined by a cleaved edge of the plurality of epitaxial layers; and (vii) an anti-reflective coating disposed on the output mirror, the anti-reflective coating being configured to prevent self-lasing, wherein the optically lossy structure creates a loss to an optical mode in a portion of the epitaxial layers disposed thereunder, thereby reducing in-plane gain and limiting participation in gain of carriers laterally diffused from the volume of epitaxial layers disposed under the waveguide metal contact pad.

22. The solid-state optical device of claim 21, further comprising:

a plurality of metal contact pads, disposed near the volume where carriers are flowing and optical beam is propagating, configured to create a controlled, tunable high resistivity contact and depletion region in regions of the plurality of epitaxial layers disposed below the contact pads, and thereby locally changing at least one of a refractive index, a carrier distribution, an optical mode profile, or loss.

23. The solid-state optical device of claim 21, wherein the optically lossy structure comprises at least one of a doped non-metal structure, a metal structure, an intentionally rough surface, or a metal-insulator-semiconductor structure.

24. A method of controlling an astigmatism of a light beam emitted by a solid-state optical device, the method comprising:

providing the solid-state optical device, the solid-state optical device comprising:

(i) a semiconductor substrate;

(ii) a solid-state gain medium disposed on a frontside of the semiconductor substrate and comprising a plurality of epitaxial layers including (a) a plurality of dopants and (b) an active region comprising at least one active layer configured to allow carrier recombination and light generation, the solid-state gain medium configured to emit the light beam with a beam propagation direction in-plane with the epitaxial layers;

(iii) a waveguide low resistivity metal contact pad disposed over and in contact with a portion of a topmost epitaxial layer of the plurality of epitaxial layers, wherein during operation carriers flow and the emitted light propagates in a volume of the epitaxial layers disposed under the waveguide electrical contact pad;

(iv) a first and a second Schottky contact comprising, respectively, a first and a second metal contact pad disposed next to the waveguide low resistivity metal contact pad, each of the first and second metal contact pads being in contact with a respective portion of a top epitaxial layer of the plurality of epitaxial layers disposed directly thereunder;

(v) an electrical contact to the semiconductor substrate;

(vi) an output mirror defined by a cleaved edge of the plurality of epitaxial layers; and (vii) an anti-reflective coating disposed on the mirror, the anti-reflective coating being configured to prevent self-lasing, wherein a depletion region is disposed in the epitaxial layers under each of the first and second metal contact pads, extending from the first and second metal contact pads; and applying a bias to each of the first and second metal contact pads to tune the depletion regions in the epitaxial layers under each of the first and second metal contact pads, thereby bending energy bands in the epitaxial layers to create a tunable potential barrier for lateral carrier out-diffusion from underneath the waveguide metal contact pad.

25. The method of claim 24, further comprising:

tuning a width of each depletion region by varying the bias, wherein tuning the width of each depletion region changes an effective waveguide width under the waveguide metal contact pad.

26. The method of claim 24, wherein a polarity of each of the bias applied to the waveguide low resistivity metal contact pad and first and second metal contact pads is the same.

27. The method of claim 24, wherein a polarity of the bias applied to the waveguide low resistivity metal contact pad is different from a polarity of the bias applied to the first and second metal contact pads.

28. A method of controlling an astigmatism of a light beam emitted by a solid-state optical device, the method comprising:

providing the solid-state optical device comprising:

(i) a semiconductor substrate;

(ii) a solid-state gain medium disposed on a frontside of the semiconductor substrate and comprising a plurality of epitaxial layers including (a) a plurality of dopants and (b) an active region comprising at least one active layer configured to allow carrier recombination and light generation, the solid-state gain medium configured to emit the light beam with a beam propagation direction in-plane with the epitaxial layers;

(iii) a waveguide low resistivity metal contact pad disposed over and in contact with a portion of a topmost epitaxial layer of the plurality of epitaxial layers, wherein during operation carriers flow and the emitted light propagates in a volume of the epitaxial layers disposed under the waveguide electrical contact pad;

(iv) a first and second metal-insulator-semiconductor (MIS) contact comprising, respectively, a first and a second metal pad disposed near the waveguide low resistivity metal contact pad, each of the first and second metal pads being disposed over an insulator layer in contact with a respective portion of a top epitaxial layer of the plurality of epitaxial layers disposed directly thereunder;

(v) an electrical substrate contact in contact with the semiconductor substrate;

(vi) an output mirror defined by a cleaved edge of the plurality of epitaxial layers; and (vii) an anti-reflective coating disposed on the output mirror, the anti-reflective coating being configured to prevent self-lasing, the method comprising the steps of:

applying a bias to each of the first and second metal contact pads to create a depletion region in the epitaxial layers directly under each of the first and second metal contact pads and extending from the first and second metal contact pads to the active region;

tuning the depletion regions by varying the bias, thereby bending energy bands in the epitaxial layers to create a tunable potential barrier for lateral carrier out-diffusion from underneath the waveguide metal contact pad.

29. The method of claim 28, further comprising:

tuning a width of each depletion region by varying the bias, wherein tuning the width of each depletion region changes an effective waveguide width under the waveguide metal contact pad.

* * * * *